United States Patent
Arimura et al.

(10) Patent No.: US 10,969,709 B2
(45) Date of Patent: Apr. 6, 2021

(54) MEMBER FOR ELECTROPHOTOGRAPHY, PROCESS CARTRIDGE AND ELECTROPHOTOGRAPHIC APPARATUS

(71) Applicant: CANON KABUSHIKI KAISHA, Tokyo (JP)

(72) Inventors: Hideya Arimura, Shizuoka (JP); Hiroaki Komatsu, Fuji (JP); Masaki Yamada, Mishima (JP)

(73) Assignee: CANON KABUSHIKI KAISHA, Tokyo (JP)

(*) Notice: Subject to any disclaimer, the term of this patent is extended or adjusted under 35 U.S.C. 154(b) by 183 days.

(21) Appl. No.: 16/378,939

(22) Filed: Apr. 9, 2019

(65) Prior Publication Data

US 2019/0324383 A1   Oct. 24, 2019

(30) Foreign Application Priority Data

Apr. 20, 2018   (JP) .............................. JP2018-081561

(51) Int. Cl.
| | |
|---|---|
| *G03G 15/02* | (2006.01) |
| *G03G 15/08* | (2006.01) |
| *G03G 21/00* | (2006.01) |
| *C08G 18/00* | (2006.01) |
| *C08G 59/00* | (2006.01) |
| *C08G 59/32* | (2006.01) |
| *C08G 18/48* | (2006.01) |

(52) U.S. Cl.
CPC ..... *G03G 15/0818* (2013.01); *C08G 18/4825* (2013.01); *C08G 59/3245* (2013.01); *G03G 15/0233* (2013.01); *G03G 15/0808* (2013.01); *G03G 21/0058* (2013.01)

(58) Field of Classification Search
CPC .......... G03G 15/0808; G03G 15/0818; G03G 15/0233; G03G 15/0928; G03G 21/0017; G03G 21/0058; G03G 2215/021; G03G 2215/0861; G03G 2221/0089; C08G 18/4825; C08G 59/3245
See application file for complete search history.

(56) References Cited

U.S. PATENT DOCUMENTS

| | | | |
|---|---|---|---|
| 5,700,845 A | * | 12/1997 | Chung ................... C08J 9/0066 521/99 |
| 7,797,833 B2 | | 9/2010 | Nakamura et al. |
| 7,799,398 B2 | | 9/2010 | Nakamura et al. |

(Continued)

FOREIGN PATENT DOCUMENTS

| | | |
|---|---|---|
| JP | S57-5047 | 1/1982 |
| JP | 2006171278 A | * 6/2006 |

(Continued)

OTHER PUBLICATIONS

U.S. Appl. No. 16/365,936, Masaki Yamada, filed Mar. 27, 2019.

*Primary Examiner* — Robert B Beatty
(74) *Attorney, Agent, or Firm* — Venable LLP

(57) ABSTRACT

There is provided a member for electrophotography, which contributes to formation of a high-quality electrophotographic image. The member for electrophotography includes an electro-conductive substrate and an electro-conductive layer as an outermost layer, wherein the electro-conductive layer contains a resin having a nitrogen-containing heterocyclic cation structure, an anion, and a specific carbon black.

9 Claims, 4 Drawing Sheets

(56) References Cited

U.S. PATENT DOCUMENTS

| | | | |
|---|---|---|---|
| 7,976,447 B2 * | 7/2011 | Urano | G03G 15/2057 |
| | | | 492/59 |
| 8,600,273 B2 | 12/2013 | Yamada et al. | |
| 8,622,881 B1 * | 1/2014 | Harada | G03G 15/0233 |
| | | | 492/56 |
| 8,655,222 B2 | 2/2014 | Nakamura et al. | |
| 8,706,011 B2 | 4/2014 | Anan et al. | |
| 8,768,226 B2 | 7/2014 | Koyanagi et al. | |
| 8,768,227 B2 | 7/2014 | Urushihara et al. | |
| 8,774,677 B2 | 7/2014 | Sakurai et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,874,007 B2 | 10/2014 | Kawamura et al. | |
| 8,874,012 B2 | 10/2014 | Yamada et al. | |
| 8,913,930 B2 | 12/2014 | Ishii et al. | |
| 9,581,931 B2 | 2/2017 | Yamada et al. | |
| 9,599,913 B2 | 3/2017 | Nishioka et al. | |
| 9,639,009 B2 | 5/2017 | Yamaguchi et al. | |
| 9,665,028 B2 | 5/2017 | Arimura et al. | |
| 9,811,009 B2 | 11/2017 | Yamada et al. | |
| 9,977,359 B2 | 3/2018 | Koyanagi et al. | |
| 9,964,914 B2 | 5/2018 | Arimura et al. | |
| 9,977,353 B2 | 5/2018 | Nishioka et al. | |
| 10,018,934 B2 | 7/2018 | Yamada et al. | |
| 10,108,129 B2 | 10/2018 | Yamaguchi et al. | |
| 10,197,930 B2 | 2/2019 | Yamada et al. | |
| 10,792,545 B2 * | 10/2020 | Goji | A63B 53/14 |
| 2006/0252620 A1 * | 11/2006 | Urano | G03G 15/0233 |
| | | | 492/56 |
| 2014/0064797 A1 | 3/2014 | Yamada et al. | |
| 2015/0331342 A1 | 11/2015 | Yamaguchi et al. | |
| 2015/0331346 A1 | 11/2015 | Yamauchi et al. | |
| 2016/0116857 A1 * | 4/2016 | Yamauchi | G03G 15/0233 |
| | | | 492/18 |
| 2016/0187801 A1 | 6/2016 | Yamada et al. | |
| 2016/0363881 A1 | 12/2016 | Urushihara et al. | |
| 2017/0090329 A1 * | 3/2017 | Yamauchi | G03G 15/0233 |
| 2017/0210719 A1 | 7/2017 | Nishioka et al. | |
| 2017/0329251 A1 | 11/2017 | Urushihara et al. | |
| 2018/0011418 A1 | 1/2018 | Arimura et al. | |
| 2018/0039200 A1 | 2/2018 | Utsuno et al. | |
| 2018/0217537 A1 * | 8/2018 | Abe | C08G 77/20 |
| 2019/0094741 A1 | 3/2019 | Uno et al. | |
| 2020/0310265 A1 * | 10/2020 | Nishioka | G03G 5/105 |
| 2020/0369085 A1 * | 11/2020 | Kim | C08L 9/06 |

FOREIGN PATENT DOCUMENTS

| | | | |
|---|---|---|---|
| JP | 2011-118113 | | 6/2011 |
| JP | 2012136711 A | * | 7/2012 |
| JP | 2015-114392 | | 6/2015 |

* cited by examiner

FIG. 1A
FIG. 1B
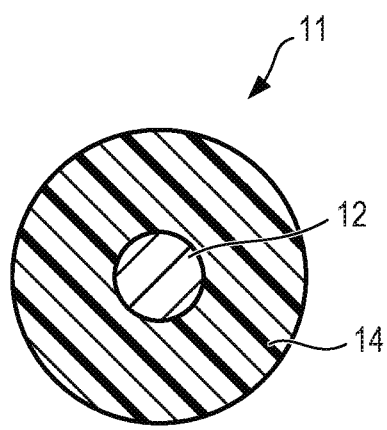
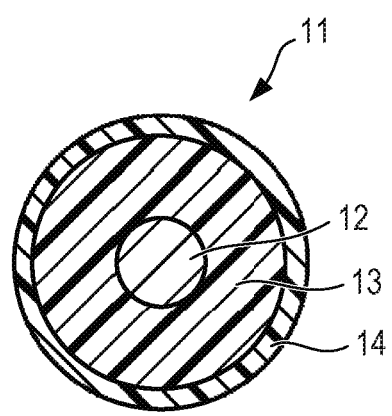

MEMBER FOR ELECTROPHOTOGRAPHY, PROCESS CARTRIDGE AND ELECTROPHOTOGRAPHIC APPARATUS

BACKGROUND OF THE INVENTION

Field of the Invention

The present disclosure relates to a member for electrophotography, which is used in an electrophotographic apparatus, and a process cartridge and an electrophotographic apparatus, which have the member for electrophotography.

Description of the Related Art

A member for electrophotography is used in various applications, for example, in a developer-carrying body (hereinafter referred to as developing roller), a transfer roller, a charging roller, a cleaning blade, a developer layer thickness regulating member (hereinafter referred to as developing blade), and a developer supplying member (hereinafter referred to as toner supplying roller). As for such a member for electrophotography, it is preferable that an electric resistance value is $10^3$ to $10^{10}$ Ω cm without being affected by a surrounding environment. Furthermore, it is preferable that the resistance of the member for electrophotography is uniform over the entire member and is stable over time.

In these members for electrophotography, an ion conductive agent is used in order to impart electrical conductivity to the members. In addition, in order to reduce the environmental dependency of the electrical conductivity by the ion conductive agent, it is also proposed to use an ion conductive agent and an electron conductive agent such as carbon black, as an electrically conductive agent.

Japanese Patent Application Laid-Open No. 2011-118113 proposes a conductive roller having a urethane coating layer including an ionic liquid having two hydroxyl groups and a urethane resin composition blended with a polyol and isocyanate. In addition, it is described that carbon black may be blended in the urethane coat layer.

SUMMARY OF THE INVENTION

One aspect of the present disclosure is directed to providing a member for electrophotography, which can form a high-quality electrophotographic image, even when having been subjected to image formation under a cryogenic environment.

Another aspect of the present disclosure is directed to providing an electrophotographic image forming apparatus that can stably output high-quality electrophotographic images. Still another aspect of the present disclosure is directed to providing a process cartridge that contributes to the stable formation of high-quality electrophotographic images.

According to one aspect of the present disclosure, there is provided a member for electrophotography, including an electro-conductive substrate and an electro-conductive layer as an outermost layer, wherein the electro-conductive layer contains (A), (B) and (C):
(A) a resin having a nitrogen-containing heterocyclic cation structure;
(B) an anion; and
(C) carbon black having a DBP absorption number of 45 ml/100 g or more and 90 ml/100 g or less and a CTAB adsorption specific surface area of 50 m²/g or more and 100 m²/g or less.

In addition, according to another aspect of the present disclosure, there is provided a process cartridge configured to be detachably mounted on a main body of an electrophotographic apparatus, and having at least one member selected from the group consisting of a charging member, a developing member and a cleaning member, wherein at least one of the charging member, the developing member and the cleaning member is the member for electrophotography described above.

There is provided an electrophotographic apparatus including at least one of a charging member, a developing member and a cleaning member, wherein the charging member, the developing member and the cleaning member are the member for electrophotography described above.

Further features of the present disclosure will become apparent from the following description of exemplary embodiments with reference to the attached drawings.

BRIEF DESCRIPTION OF THE DRAWINGS

FIG. 1A illustrates a conceptual diagram illustrating a member for electrophotography according to one aspect of the present disclosure.

FIG. 1B illustrates a conceptual diagram illustrating a member for electrophotography according to one aspect of the present disclosure.

DESCRIPTION OF THE EMBODIMENTS

Figure 2:
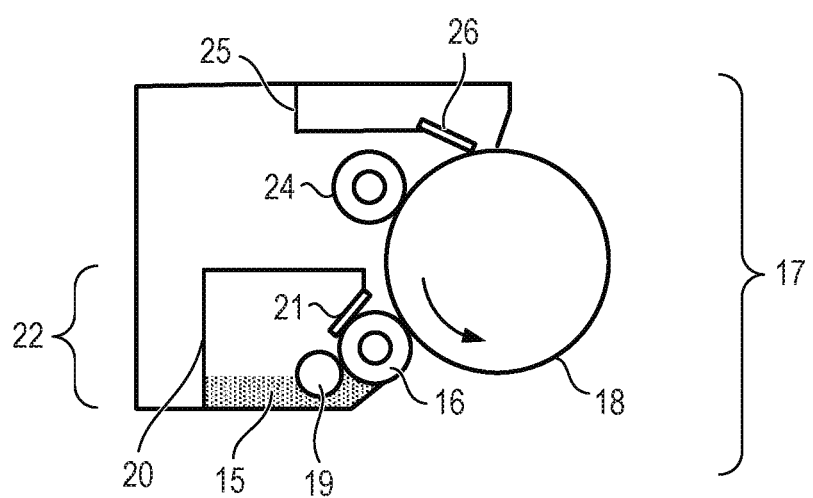
FIG. 2 illustrates a conceptual diagram illustrating a process cartridge according to one aspect of the present disclosure.

Preferred embodiments of the present disclosure will now be described in detail in accordance with the accompanying drawings.

We employed a developing roller as described in Japanese Patent Application Laid-Open No. 2011-118113, i.e. a developing roller provided with an outermost layer containing a resin having an imidazolium cation that is immobilized and an anion, to the formation of an electrophotographic image, and we found that there was the case where even when, for example, a white solid image was output, such so-called "fogging" occurred that a developer was transferred. The occurrence of the "fogging" on the electrophotographic image was remarkably observed when the electrophotographic image was formed in a low-temperature environment such as a temperature of 0° C. (hereinafter referred to as cryogenic environment).

The present inventors assume a reason of causing the above described "fogging", when the developing roller provided with the outermost layer containing the resin having immobilized the imidazolium cation therein and the anion has been used for forming an electrophotographic image in the cryogenic environment, as following.

The ion conductive agent develops electrical conductivity by migrations of an anion and a cation. Here, when the cation is immobilized in the resin, the mobility of the cation decreases, and consequently the mobility of the anion also decreases. Thereby, the change over time of the electrical conductivity which originates in the ion conductive agent can be suppressed, and the bleeding of the ions to the outer surface of the outermost layer can be suppressed. On the other hand, because the mobility of the anion decreases, a relaxation time of an electric charge in the outermost layer becomes longer. As a result, for example, in the case where an electrophotographic image is formed under the cryogenic environment, attenuation of the electric charge on the surface of the developing roller cannot catch up therewith, and the electric charge tends to be easily accumulated on the surface of the developing roller. The above described "fogging" is considered to be caused by a phenomenon that the surface of the developing roller has been excessively electrically charged. The relaxation time of the electric charge is a period of time before electric charge attenuates to 1/e.

Then, the present inventors have studied to incorporate carbon black into the outermost layer of the above described developing roller according to the description in Japanese Patent Application Laid-Open No. 2011-118113. Specifically, the electrical conductivity due to the electron conductive agent such as carbon black is developed by electrons flowing through a conductive path that is formed by the electron conductive agent which has come into contact or close contact. Because of this, it has been expected that the relaxation time of the electric charge becomes short by the carbon black which acts complementarily to the ion conductive agent. However, contrary to the prediction of the present inventors, in the developing roller provided with the outermost layer containing the resin having the imidazolium cation immobilized therein, the anion and the carbon black, the relaxation time of the electric charge of the outermost layer became remarkably long, and as a result, could not solve the above described "fogging". The reason why the relaxation time of the electric charge on the outermost layer became long in such a developing roller contrary to expectation has been assumed to be as follows.

Specifically, a state of the conductive path formed by the electron conductive agent depends on a dispersion state of the electron conductive agent, and when the dispersion state is insufficient, there can be the case where the conductive path is incomplete. It is considered that even in such a situation, when the ion conductive agent coexists, the ion conductive agent compensates for the conductivity of the incomplete portion of the conductive path, thereby exhibits high conductivity and also can shorten the relaxation time of the electric charge. However, according to experimental results of the present inventors, there has been the case where even though the outermost layer is formed of both of the carbon black and the ion conductive agent which coexist, the relaxation time of the electric charge does not almost differ from that of the outermost layer containing only the electron conductive agent. In other words, there has been the case where the contribution of the ion conductive agent was not observed. Then, the present inventors have assumed that the action of the ion conductive agent is weakened by such a phenomenon that the ions in the outermost layer are adsorbed by the carbon black; and have paid attention to and have further studied physical properties of the carbon black to be used. As a result, the present inventors have found that a CTAB adsorption specific surface area and DBP absorption number of the carbon black greatly give an influence on a degree of ion adsorption by the carbon black.

It is considered that concerning of the CTAB adsorption specific surface area, a size of a molecular cross-sectional area of an anion is involved. A size of an anion in the ion conductive agent is generally larger than that of a nitrogen molecule. Because of this, it is considered that the adsorption specific surface area of a CTAB molecule (cetyltrimethylammonium bromide 0.616 nm$^2$) larger than a nitrogen molecule (0.162 nm$^2$) which is often used for the measurement of specific surface area can be a parameter which relates to the absorbency of the anion by the carbon black.

In addition, the DBP absorption number represents the amount of DBP (dibutyl phthalate) which the carbon black can retain, and is considered to be a parameter having a correlation with the amount of a polymer compound such as a resin, which the carbon black can retain. In the case where a cation structure is immobilized in a resin, the resin is retained by the carbon black, and thereby also the cation is restrained by the carbon black. In addition, the anion in the outermost layer usually exists in the vicinity of the cation structure, and it is considered that the anion also comes in close contact to the carbon black and tends to be easily adsorbed by the pores on the surface of the carbon black. Accordingly, it is considered that the DBP absorption number can also be one index which indicates a restraining force for the anion by the carbon black.

Based on such consideration, the present inventors have studied the carbon black to be contained in the outermost layer. As a result, the present inventors have found that even in the case where a carbon black having a DBP absorption number of 45 to 90 ml/100 g and a CTAB adsorption specific surface area of 50 to 100 m$^2$/g coexists with a resin into which a cation structure is introduced and an anion, the carbon black can effectively suppress the adsorption of the anion and the retention of the resin, as a result, can shorten the relaxation time of the electric charge of a developing member, also when an electrophotographic image is formed under the cryogenic environment.

The use of such carbon black is particularly effective when the cation structure to be introduced into the resin is a nitrogen-containing heterocyclic cation. Specifically, when a cation which a resin has is a non-cyclic cation such as quaternary ammonium, a molecular mobility of the cation moiety is high, and an excluding volume of the cation moiety is large compared to the nitrogen-containing heterocyclic cation. On the other hand, when the cation which the resin has is a nitrogen-containing heterocyclic cation, the structure is rigid, accordingly the molecular mobility is small compared to the non-cyclic cation, and the excluding volume is also small. Because of this, the nitrogen-containing heterocyclic cation can easily approach to and be retained by the surface of the carbon black compared to the non-cyclic cation. In addition, it is considered that when the nitrogen-containing heterocyclic cation is a nitrogen-containing heteroaromatic cation having an aromatic ring, $\pi$ electrons in the aromatic ring mutually interacts with $\pi$ electrons originating in a cyclic hydrocarbon existing on the surface of the carbon black, and tends to be more easily retained by the carbon black. However, the above described carbon black having the specific DBP absorption number and the CTAB adsorption specific surface area can effectively suppress the adsorption/retention of the nitrogen-containing heterocyclic cation or the nitrogen-containing heteroaromatic cation.

The DBP absorption number is also used as a parameter which indicates a degree of development of the structure of the carbon black. The carbon black according to the present aspect, which has such a small DBP absorption number that the DBP absorption number is 45 to 90 ml/100 g, resists developing the structure of its own, and in the outermost layer containing only such carbon black, it is difficult to obtain an effect of reducing the relaxation time of the electric charge.

The member for electrophotography according to the present disclosure will be described in detail below. In the present disclosure, the member for electrophotography refers to: a conductive roller such as a developing roller, a transfer roller, a charging roller and a toner supplying roller; a developing blade; and a cleaning blade.

FIGS. 1A and 1B illustrate one embodiment in the case where the member for electrophotography according to one aspect of the present disclosure is used as the conductive roller. A structure of the conductive roller 11 includes, for example, as shown in FIG. 1A, an electro-conductive substrate 12 and an electro-conductive layer 14 which is provided on the outer circumference of the substrate. In addition, the conductive roller 11 may have, as shown in FIG. 1B, an elastic layer 13 on the outer circumference of the electro-conductive substrate 12, and the electro-conductive layer 14 may be formed on the outer circumference of the elastic layer 13. As for the electro-conductive layer 14, a plurality of layers may be formed. The outermost layer of the conductive roller 11 is the electro-conductive layer, and contains a resin having a nitrogen-containing heterocyclic cation structure, an anion, and a specific carbon black.

<Substrate>

The substrate 12 functions as the support member of the member for electrophotography, and in some cases, as an electrode. The substrate 12 is formed from a conductive material which includes: a metal such as aluminum and copper; an alloy such as stainless steel; iron plated with chromium or nickel; and a synthetic resin having conductivity. In the case where the member for electrophotography has a roller shape, the substrate 12 has a solid columnar shape or a hollow cylindrical shape, and when the member for electrophotography has a blade shape, the substrate 12 has a sheet shape.

<Elastic Layer>

The elastic layer 13 is, particularly in the case where the member for electrophotography has a roller shape, a layer for imparting elasticity necessary for forming a nip having a predetermined width, to the member for electrophotography, at a contact portion with a member in contact with the member for electrophotography.

It is preferable that the elastic layer 13 is a molded body of a rubber material. Examples of the rubber material include the followings: ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluoro-rubber, silicone rubber, epichlorohydrin rubber, hydroxide of NBR, and urethane rubber. These materials can be used alone or in admixture of two or more types. Among them, the silicone rubber is particularly preferable, from the viewpoints of compression set and flexibility. Examples of the silicone rubber include polydimethylsiloxane, polytrifluoropropylsiloxane, polymethylvinylsiloxane, polyphenylvinylsiloxane, and copolymers of these polysiloxanes.

Examples of a method of molding the elastic layer 13 include a method of cast molding a liquid rubber material, and a method of extrusion molding a kneaded rubber material.

In the elastic layer 13, a conductivity imparting agent is appropriately blended, in order to impart the conductivity to the elastic layer.

Usable conductivity imparting agents include: carbon black; a conductive metal such as aluminum and copper; and a fine particle of a conductive metal oxide such as zinc oxide, tin oxide and titanium oxide. Among them, the carbon black is particularly preferable which is comparatively easily available and provides adequate electrical conductivity. When the carbon black is used as the conductivity imparting agent, it is preferable that 2 to 50 parts by mass of the carbon black with respect to 100 parts by mass of rubber are blended.

In the elastic layer 13, various additives such as a non-conductive filler, a crosslinking agent and a catalyst may be blended appropriately. Examples of the non-conductive filler include silica, quartz powder, titanium oxide, zinc oxide or calcium carbonate.

The crosslinking agent is not limited in particular, but examples thereof include tetraethoxysilane, di-t-butyl peroxide, 2,5-dimethyl-2,5-di(t-butylperoxy)hexane and dicumylperoxide.

It is preferable that the thickness of the elastic layer is 0.3 mm or more and 4.0 mm or less.

<Electro-Conductive Layer>

The composition of the electro-conductive layer 14 in one embodiment of the member for electrophotography will be described in detail below.

The electro-conductive layer positioned in the outermost layer contains a resin having a nitrogen-containing heterocyclic cation structure, an anion and carbon black. As for the carbon black, a DBP absorption number is 45 ml/100 g or more and 90 ml/100 g or less, and a CTAB adsorption specific surface area is 50 $m^2/g$ or more and 100 $m^2/g$ or less.

The resin having the nitrogen-containing heterocyclic cation structure and the anion are obtained by a reaction between an ion conductive agent and a chemical compound which can react with the ion conductive agent. For these reactions, such a general reaction can be used as to polymerize monomers to obtain a polymer. Examples of the resin structure obtained by the reaction between the ion conductive agent and the chemical compound which can react with the ion conductive agent include a polyurethane resin, a polyester resin, a polyether resin, an acrylic resin, an epoxy resin, or an amino resin such as melamine. From the viewpoint of abrasion resistance, a urethane resin is preferable. The urethane resin is obtained, for example, by making polyisocyanate react with an ion conductive agent having at least one group from among a hydroxyl group, an amino group and a glycidyl group, in the nitrogen-containing heterocyclic cation structure.

The ion conductive agent refers to one of materials for synthesizing a resin contained in the outermost layer, and refers to a material in a state before reacting with a chemical compound which can react with a cation. In addition, the cation means a cation contained in the ion conductive agent It is preferable that the nitrogen-containing heterocyclic cation structure has either one or both of the structures represented by Structural Formulae (1) and (2), from the viewpoint of the electrical conductivity.

Furthermore, it is preferable to have one or both of the structures represented by Structural Formulae (3) and (4), from the viewpoint of the stability of the relaxation time of the electric charge. Structural Formulae (3) and (4) have two bonding points with the resin, and become the structure incorporated in the main chain of the resin. Because of this, a degree of freedom of molecular motion is limited, compared to the case where there is only one bonding point located at the terminal or a side chain, and it becomes difficult for the above structure to be adsorbed by carbon black. It is considered that as a result, the anion resists approaching to the carbon black, and that the relaxation time of the electric charge has become stable. When the number of bonding points is 3 or more, the degree of freedom of the molecular motion of the cation is further limited. Because of this, it is considered that the mobility of the anion which is restricted by the cation is excessively limited, and the relaxation time of the electric charge has become longer than the case where the bonding points are two.

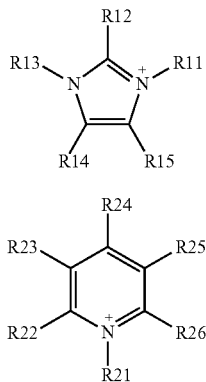

Structural Formula (1)

Structural Formula (2)

(R11 to 15 and R21 to 26 are each independently selected from the following (a) to (c), and at least one of R11 to R15 and R21 to R26 is (c), wherein (a) is a hydrogen atom, (b) is a saturated hydrocarbon group having 1 to 6 carbon atoms, and (c) is a structure containing a moiety bonded to a resin.)

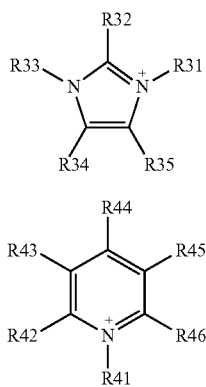

Structural Formula (3)

Structural Formula (4)

(R31 to 35 and R41 to 46 are each independently selected from the following (a) to (c), and two of R31 to R35 and R41 to R46 are (c), wherein (a) is a hydrogen atom, (b) is a saturated hydrocarbon group having 1 to 6 carbon atoms, and (c) is a structure containing a moiety bonded to a resin.)

In Structural Formulae (1) to (4), the structure of (c) is each independently a structure represented by the following Structural Formulae (Z-1) to (Z-3). Structural Formula (Z-1) is, for example, a residue which is formed by a reaction between a hydroxyl group introduced into the nitrogen-containing heterocyclic cation, and a chemical compound having an isocyanate group in a raw material of the resin. Structural Formula (Z-2) is, for example, a residue formed by a reaction between an amino group introduced into the nitrogen-containing heterocyclic cation, and a chemical compound having an isocyanate group in a raw material of the resin. Structural Formula (Z-3) is, for example, a residue formed by a reaction between a glycidyl group introduced into the cationic group, and a chemical compound having an isocyanate group in a raw material of the resin.

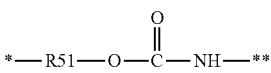

Structural Formula (Z-1)

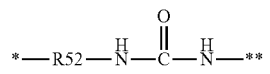

Structural Formula (Z-2)

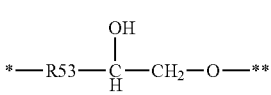

Structural Formula (Z-3)

(R51 to 53 each independently represent a linear or branched divalent hydrocarbon group, the symbol "*" indicates a bonding moiety with a nitrogen atom or a carbon atom of Structural Formulae (1) to (4), and the symbol "**" indicates a bonding moiety with a carbon atom in a polymer chain constituting the resin.)

For example, a resin having a nitrogen-containing heterocyclic cation structure and an anion can be obtained by mixing the following materials and making the materials react with each other:

known polyol such as polyether polyol;
known polyisocyanate: and
an ion conductive agent that includes a cation having a nitrogen-containing heterocyclic skeleton and having at least one selected from the group consisting of a hydroxyl group, an amino group and a glycidyl group, and an anion.

Examples of the polyol include polyether polyol, polyester polyol or polycarbonate polyol, polyolefin polyol, and acryl polyol. Among the polyols, the polyether polyol, the polyester polyol, the polycarbonate polyol, and a urethane prepolymer polyol which is obtained by making any of the polyols react with isocyanate is preferable, from the viewpoint of compatibility with the ion conductive agent.

Examples of the polyether polyol include polyethylene glycol, polypropylene glycol, and polytetramethylene glycol.

Examples of the polyester polyol include polyester polyols obtained by a condensation reaction of a diol component such as 1,4-butanediol, 3-methyl-1,4-pentanediol, neopentyl glycol, or a triol component such as trimethylolpropane, with a dicarboxylic acid such as adipic acid, phthalic anhydride, terephthalic acid and hexahydroxy phthalic acid.

Examples of the polycarbonate polyol include the followings which include polycarbonate polyols obtained by a condensation reaction of a diol component such as 1,3-propanediol, 1,4-butanediol, 1,6-hexanediol, 3-methyl-1,5-pentanediol, diethylene glycol, polyethylene glycol, polypropylene glycol and polytetramethylene glycol, with a dialkyl carbonate such as phosgene and dimethyl carbonate, or a cyclic carbonate such as ethylene carbonate.

These polyol components may be used as a prepolymer as needed, of which the chain has been previously extended by an isocyanate such as 2,4-tolylene diisocyanate (TDI), 1,4-diphenylmethane diisocyanate (MDI) and isophorone diisocyanate (IPDI).

Examples of the isocyanate compound include: aliphatic polyisocyanates such as ethylene diisocyanate and 1,6-hexamethylene diisocyanate (HDI); alicyclic polyisocyanates such as isophorone diisocyanate (IPDI), cyclohexane-1,3-diisocyanate and cyclohexane-1,4-diisocyanate; aromatic isocyanate such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate; and isocyanate compounds such as a copolymer, an isocyanurate form, a TMP adduct form, a biuret form, and a block form of the above isocyanate compounds. Among the isocyanate compounds, aromatic isocyanates such as tolylene diisocyanate, diphenylmethane diisocyanate and the polymeric diphenylmethane diisocyanate are preferable, from the viewpoint of reactivity.

Examples of the ion conductive agent that has a nitrogen-containing heterocyclic structure and is formed of a cation having at least one selected from the group consisting of a hydroxyl group, an amino group and a glycidyl group, and of an anion include imidazolium, pyrazinium, pyrimidinium, imidazolidinium, imidazolinium, piperazinium, pyridinium, pyrrolidinium, pyrrolinium, piperidinium, azepanium, pyrrolium, azepanium-imidazolium, pyrazinium and pyrimidinium.

Specific examples of the cation which gives the structure represented by Structural Formula (1) and has a hydroxyl group include 1-methyl-3-hydroxymethyl imidazolium cation, 1-methyl-3-(2-hydroxyethyl) imidazolium cation, 1-methyl-3-(3-hydroxypropyl) imidazolium cation, 1-methyl-3-(4-hydroxybutyl) imidazolium cation, 1-methyl-3-(6-hydroxyhexyl) imidazolium cation, 1-ethyl-3-(2-hydroxyethyl) imidazolium cation, 1-n-butyl-3-(2-hydroxyethyl) imidazolium cation, 1,3-dimethyl-2-(2-hydroxyethyl) imidazolium cation, 1,3-dimethyl-2-(4-hydroxybutyl) imidazolium cation, 1,3-dimethyl-4-(2-hydroxyethyl) imidazolium cation, and derivatives thereof.

Specific examples of the cation which gives the structure represented by Structural Formula (2) and has a hydroxyl group include 1-methyl-2(2-hydroxyethyl) pyridinium, 1-ethyl-3 (2-hydroxyethyl) pyridinium, 1-methyl-4(2-hydroxyethyl) pyridinium, 1-methyl-4 hydroxymethyl pyridinium, 1-methyl-4(2-hydroxyisobutyl) pyridinium, and 1,5 diethyl-2(2-hydroxyethyl) pyridinium.

Specific examples of the cation which gives the structure represented by Structural Formula (3) and has two hydroxyl groups include 1,3-bishydroxymethyl imidazolium cation, 1,3-bis(2-hydroxyethyl) imidazolium cation, 2-methyl-1,3-bishydroxymethyl imidazolium cation, 2-methyl-1,3-bis(2-hydroxyethyl) imidazolium cation, 4-methyl-1,3-bis(2-hydroxyethyl) imidazolium cation, 2-ethyl-1,3-bis(2-hydroxyethyl) imidazolium cation, 4-ethyl-1,3-bis(2-hydroxyethyl) imidazolium cation, 2-n-butyl-1,3-bis(2-hydroxyethyl) imidazolium cation, 1,3-bis(3-hydroxypropyl) imidazolium cation, 1,3-bis(6-hydroxyhexyl) imidazolium cation, 1,3-bis(8-hydroxyoctyl) imidazolium cation, 1-methyl-2,3-bis(2-hydroxyethyl) imidazolium cation, 1-methyl-3,4-bis(2-hydroxyethyl) imidazolium cation, 1-methyl-3,5-bis(2-hydroxyethyl) imidazolium cation, and derivatives thereof.

Specific examples of the cation which gives the structure represented by Structural Formula (4) and has two hydroxyl groups include 1,2-bishydroxymethyl pyridinium cation, 1,3-bishydroxymethyl pyridinium cation, 1,4-bishydroxymethyl pyridinium cation, 1,2-bis(2-hydroxyethyl) pyridinium cation, 1,3-bis(2-hydroxyethyl) pyridinium cation, 1,4-bis(2-hydroxyethyl) pyridinium cation, 1,2-bis(3-hydroxypropyl) pyridinium cation, 1,3-bis(3-hydroxypropyl) pyridinium cation, 1,4-bis(3-hydroxypropyl) pyridinium cation, 1,2-bis(6-hydroxyhexyl) pyridinium cation, 1,3-bis(6-hydroxyhexyl) pyridinium cation, 1,4-bis(6-hydroxyhexyl) pyridinium cation, 1,2-bis(8-hydroxyoctyl) pyridinium cation, 1,3-bis(8-hydroxyoctyl) pyridinium cation, 1,4-bis(8-hydroxyoctyl) pyridinium cation, 2-methyl-1,3-bis(2-hydroxyethyl) pyridinium cation, 2-ethyl-1,3-bis(2-hydroxyethyl) pyridinium cation, 5-methyl-1,3-bis(2-hydroxyethyl) pyridinium cation, 5-ethyl-1,3-bis(2-hydroxyethyl) pyridinium cation, and derivatives thereof.

Examples of the cation having the amino group and the glycidyl group include a cation having a structure in which the amino group or the glycidyl group substitutes for the hydroxyl group in the above described cation.

Examples of the anion of the ion conductive agent include a fluoroalkyl sulfonyl imide anion and a fluoroalkyl sulfonate anion, a fluoroalkyl carboxylic acid anion, a fluoroborate anion, a dicyanamide anion, a bisoxalato borate anion, a thiocyanate anion, a fluorophosphate anion, a fluoroalkyl methoxide anion, a fluorosulfonyl imide anion, and derivatives thereof.

Specific examples of the fluoroalkyl sulfonyl imide anion include: fluoroalkyl sulfonyl imide anions having a fluoroalkyl group having 1 to 6 carbon atoms such as a bis(trifluoromethanesulfonyl) imide anion, a bis(pentafluoroethanesulfonyl) imide anion, a bis(heptafluoropropylsulfonyl) imide anion, a bis(nonafluorobutanesulfonyl) imide anion, a bis(dodecafluoropentylsulfonyl) imide anion, and a bis(perfluorohexylsulfonyl) imide anion; and cyclic fluoroalkylsulfonyl imide anions such as N,N-hexafluoropropane-1,3-disulfonyl imide.

Specific examples of the fluoroalkylsulfonate anion include a trifluoromethanesulfonic acid anion, a fluoromethanesulfonic acid anion, a perfluoroethylsulfonic acid anion and a perfluorobutylsulfonic acid anion.

Among these anions, the bis(trifluoromethanesulfonyl) imide anion, the bis(pentafluoroethanesulfonyl) imide anion, the bis(nonafluorobutanesulfonyl) imide anion, and the N,N-hexafluoropropane-1,3-disulfonyl imide anion are particularly preferable, because such a state that the relaxation time of the electric charge is short can be maintained even when a large amount of paper has been printed. These anions are large in size, and accordingly resist being trapped by the pores on the surface of the carbon black. In addition, it is presumed that if the anion has been trapped, an area of the carbon surface becomes large which the anion covers, accordingly the total number of anions decreases which are trapped by the carbon black, and accordingly the above anions are excellent in the stability over time.

It is preferable to mix the polyol component and the isocyanate compound so that the ratio of the isocyanate group to the hydroxyl group of 1.0 is in a range of 1.0 or more and 2.0 or less, because thereby unreacted components can be reduced.

Due to these reactions, it is possible to obtain a resin in which a three-dimensionally crosslinked urethane resin and a nitrogen-containing heterocyclic cation are bonded by a urethane bond, and it is further possible to make an anion exist in the resin. These states can be checked, for example, by analyzing the resin by known unit such as thermal decomposition GC/MS, FT-IR, and NMR.

In addition to the resin having the nitrogen-containing heterocyclic cation structure, the electro-conductive layer for the outermost layer may contain resins such as a polyurethane resin, a polyester resin, a polyether resin, an acrylic resin, an epoxy resin, and an amino resin such as melamine.

The electro-conductive layer for the outermost layer contains the carbon black of which the DBP absorption number is 45 ml/100 g or more and 90 ml/100 g or less and of which the CTAB adsorption specific surface area is 50 $m^2/g$ or more and 100 $m^2/g$ or less. The DBP absorption number by carbon black is an index indicating a void ratio among aggregates of the carbon black. The DBP absorption number is an amount of DBP (dibutyl phthalate) which is needed for a certain mass of carbon black having been made to absorb DBP to reach a predetermined torque in a process of becoming a viscous state. This DBP absorption number is used also as of unit evaluating the structure which is a degree of development of the aggregate. The CTAB adsorption specific surface area is a specific surface area ($m^2/g$) at the time when CTAB (n-hexadecyltrimethylammonium bromide) has been adsorbed, and is one index for determining an external surface area which does not contain micropores of the carbon black.

By the DBP absorption number being controlled to 45 ml/100 g or more, it is possible to obtain an effect of improving the charge transfer speed by the addition of the carbon black, and by the DBP absorption number being controlled to 90 ml/100 g or less, it is possible to reduce a resin adsorbed by the carbon black. If the DBP absorption number by the carbon black to be added is 45 ml/100 g or more, the structure of the carbon black develops sufficiently, and the carbon blacks tend to come into contact with or close contact with each other. Because of this, the effect of improving the charge transfer speed due to an increase of the path of electron conduction becomes larger than an effect of the charge transfer delay which occurs due to an increase of the interface between the resin and the carbon black. Because of this, the relaxation time of the electric charge is not extended. In addition, if the DBP absorption number by the carbon black to be added is 90 ml/100 g or less, it is difficult for the resin to be adsorbed to the vicinity of the carbon black, and the cation structure and the anion also resist being restricted by the carbon black. As a result, the effect of improving the charge transfer speed by the addition of carbon black becomes larger than the effect of restricting cations and anions due to carbon black. Because of this, unevenness of the movement speed of the electric charge is reduced, and the relaxation time of the electric charge as a whole is not extended.

The CTAB adsorption specific surface area has a large influence on an interaction between carbon black and an anion. By the CTAB adsorption specific surface area being controlled to 50 $m^2/g$ or more and 100 $m^2/g$ or less, the carbon black can easily transfer an electric charge with an anion, and at the same time can reduce the adsorption amount of anions. When the CTAB adsorption specific surface area is 50 $m^2/g$ or more, the area on which the carbon black can transfer an electric charge with an anion becomes sufficiently large. In order that the carbon black shows the effect of improving the charge transfer speed, it is indispensable that the carbon black transfers an electric charge with an anion, and accordingly it is considered that the effect of improving the charge transfer speed has been obtained by the charge transferable area having been sufficiently increased. On the other hand, when the CTAB adsorption specific surface area is 100 $m^2/g$ or less, the effect of trapping the anion becomes sufficiently small. Because of this, the amount of anions which are carriers of electric charges is not reduced and the relaxation time of the electric charge is not extended.

Furthermore, as for the carbon black, it is particularly preferable that a volatile content is 1.5% or more, which is a rate of weight reduction when the carbon black has been heated at 950° C. for 7 minutes, because the carbon black is excellent in the stability of the relaxation time of the electric charge against long-term energization. The volatile component of the carbon black is mainly an oxygen-containing functional group which is condensed on the surface. Because of this, when the volatile content is 1.5% or more, the amount of the oxygen-containing functional groups on the surface of the carbon black increases. Because the oxygen-containing functional group is ionized by surrounding moisture or the like, it is considered that even though an anion has been trapped on the carbon surface, electrostatic repulsion with the ionized oxygen-containing functional group occurs, and the anion tends to be easily released.

As for a method of taking out and isolating the carbon black component from the electro-conductive layer for the outermost layer, a generally known method may be used. Examples of the method include a method of heating a piece of the electro-conductive layer under a nitrogen gas stream in a rotary kiln at a high temperature for a certain period of time to decompose the resin component, and collecting the carbon black component from the residue. When the electro-conductive layer is a urethane resin, the electro-conductive layer can be decomposed by being heated with an amine such as pyridine and diethanol amine, or the like.

When inorganic additives such as quartz and talc in addition to the carbon black are contained in the residue, the carbon black component can be separated by utilizing the difference between the specific gravities. The method of taking out and isolating the carbon black component from the electro-conductive layer is not limited to this, and a generally used method may be used.

The DBP absorption number and the CTAB adsorption specific surface area and the volatile-matter content of the carbon black can be measured by isolating the carbon black from the resin according to the above described method. The DBP absorption number can be measured, based on JIS K6217-4 (2008) carbon black for rubber—basic characteristics—Part 4: method for determining an oil absorption number. The CTAB adsorption specific surface area can be measured, based on JIS K6217-3 (2008) carbon black for rubber—basic characteristics—Part 3; method for determining the specific surface area—CTAB adsorption method. The volatile-matter content can be measured, based on JIS K6221 (1982) testing method for carbon black for rubber.

The carbon black may be a commercially available product, a product obtained by treating the commercially available product, or a newly produced product, and is not limited in particular. Usable carbon blacks are oil furnace black, gas furnace black, channel type of carbon black, carbon blacks obtained by subjecting those carbon blacks to oxidation treatment, and the like. Specific examples of the commercially available products include; SUNBLACK 605 and SUNBLAK X 55 (made by Asahi Carbon Co., Ltd.); #25, #50 and MA11 (made by Mitsubishi Chemical Corporation); Toka Black #7360SB and #7400 (made by Tokai Carbon Co., Ltd.); Printex 25 and Special Black 350 (made by Orion Engineered Carbons); and REAGAL 350 (made by Cabot Corporation). The DBP absorption number, the CTAB adsorption specific surface area and the volatile-matter content of the carbon black which has been isolated from the electro-conductive layer may be in the previously described range, and a plurality of types of carbon black may be used.

From the viewpoint of the stability of the relaxation time of the electric charge, it is preferable that X, Y and Z satisfy the following Expression (1):

$$210 \leq \frac{YZ}{X} \leq 5400 \qquad \text{Expression (1)}$$

wherein X (g) represents the mass of the anion, Y ($m^2/g$) represents the CTAB adsorption specific surface area of the carbon black, and Z (g) represents the mass of the carbon black, contained in the electro-conductive layer for the outermost layer.

Here, the mass of the anion and the mass of the carbon black are the masses of the respective components contained in a piece of the electro-conductive layer having an arbitrary mass, and it is acceptable to use the pieces of the electro-conductive layer having the same mass, for the measurement.

In Expression (1), YZ is the total specific surface area of the carbon black which can trap the anion. Since the ratio of the total specific surface area to the anion is within the range of Expression (1), even when electrons are transferred between the anion and the carbon black many times by energization, the anion resists being trapped, and the relaxation time of the electric charge resists changing.

As for a method of taking out and quantifying the anion component from the electro-conductive layer, a generally known method may be used. For example, the method includes: immersing a piece of the electro-conductive layer in the solution in which a salt such as lithium bromide is dissolved and of which the concentration is known; and exchanging the anion contained in the electro-conductive layer with a bromide anion. After that, the bromide anion in the solution is quantified in which the piece of the electro-conductive layer has been immersed, for example, by LC/MS or the like. Then, the amount of bromide anions lost by anion exchange can be calculated for the amount of the anion contained in the electro-conductive layer.

Various additives can be added to the electro-conductive layer, as needed. For example, when a certain degree of surface roughness is required as the member for electrophotography, a fine particle for the roughness control may be added to the electro-conductive layer. Usable materials for the fine particle for controlling the roughness include a polyurethane resin, a polyester resin, a polyether resin, a polyamide resin, an acrylic resin or a phenol resin. From the viewpoint of a strength of a salient on the surface, it is preferable that the fine particle is a crosslinked resin.

When the fine particle of the urethane resin is used as the crosslinked resin, it is preferable for the glass transition temperature of the resin particle to be −10° C. or lower, and is more preferable to be −30° C. or lower, from the viewpoint of suppressing the falling off of the resin particle. It is considered that when the glass transition temperature of the resin particle is −10° C. or lower, the molecular mobility of the surface of the resin particle is hard to be suppressed even at low temperature, and an interaction with a resin having the nitrogen-containing heterocyclic cation structure tends to work easily.

It is preferable that the volume average particle diameter of the fine particle for controlling the roughness is 1 µm or larger and 15 µm or smaller. It is preferable that the content of the fine particle for controlling the roughness in the electro-conductive layer is 1 part by mass or more and 90 parts by mass or less, with respect to 100 parts by mass of the resin.

As for other additives, commonly used additives can be used. Examples of the additives include a non-conductive filler, an ultraviolet absorber, a light stabilizer, a flame retardant, an antistatic agent and a liquid rubber.

The electro-conductive layer can contain an ionic liquid which does not form a chemical bond with a resin and is liquid at ordinary temperature (25° C.), as an additive, but it is preferable that the ratio of a mass of the cation originating in the ionic liquid to a mass of the total anions contained in the electro-conductive layer is less than 30%. The cation and the anion of the ionic liquid are not restricted by the matrix resin, and accordingly the movement speed of an electric charge is high, and the effect of the present disclosure is not obstructed by the addition. However, it is preferable that the electro-conductive layer contains the ionic liquid in an amount of less than 30%, in consideration that there is a possibility of inducing another harmful effect such as bleeding to the surface because the ionic liquid is not restricted. The mass of the total anions contained in the electro-conductive layer can be measured in a similar way to that of the quantitative determination of the mass of the anion contained in the electro-conductive layer, and is the sum of the masses of the counter anion in the resin having the nitrogen-containing heterocyclic cation structure and the anion originating in the ionic liquid. The mass of the cation originating in the ionic liquid can be quantified from an eluate in which the piece of the electro-conductive layer has been immersed and the ionic liquid has been eluted.

It is preferable that the relaxation time of the electric charge of the electro-conductive layer is short, from the viewpoint of coping with a high-speed process.

For example, when the electro-conductive layer has been used for a roller shape, it is preferable that the relaxation time of the electric charge is 0.1 seconds or shorter, from the viewpoint of coping with the high-speed process, because the rotation speed of the roller is approximately 0.2 seconds/one rotation, and accordingly even if the rotation speed has further risen, the electric charge attenuates before the roller makes a round.

The relaxation time of the electric charge can be measured by a measurement method which will be described later. When the initial potential is represented by $V_0$, a time period before the voltage decreases to $V_0/e$ is defined as the relaxation time of the electric charge. For information, e is the base of natural logarithm.

The initial potential is the surface potential after 0.0625 seconds after electric discharge. The reason why the initial potential is set to be 0.0625 seconds after the electric discharge is because it is difficult to measure the surface potential immediately after the corona discharge, and the 0.0625 seconds are necessary for the initial potential to be stabilized in a range which can allow the dispersion of the measurement.

The method for forming the electro-conductive layer 14 is not limited in particular, but includes a spraying method, a dipping method and a roll coating method of paint. The dip coating method which makes the paint overflow from the upper end of the dipping tank as described in Japanese Patent Application Laid-Open No. S57-5047 is simple and excellent in production stability, as a method for forming the electro-conductive layer.

The member for electrophotography according to one aspect of the present disclosure can be applied to any of a non-contact type developing apparatus and a contact type developing apparatus which use a magnetic one-component developer or a non-magnetic one component developer, a developing apparatus which uses a two-component developer, and the like.

A process cartridge according to one aspect of the present disclosure is a process cartridge configured to be detachably mounted on a main body of an electrophotographic apparatus, and having at least one unit selected from the group consisting of a charging unit, a developing unit and a cleaning unit.

FIG. 2 illustrates a cross-sectional view illustrating a process cartridge according to one aspect of the present disclosure. A process cartridge 17 illustrated in FIG. 2 integrates a developing roller 16, a developing blade 21, a developing apparatus 22, an electrophotographic photosensitive body 18, a cleaning blade 26, a waste toner storage container 25 and a charging roller 24. In addition, the process cartridge 17 is configured so as to be attachable to and detachable from the main body of the electrophotographic apparatus. The developing apparatus 22 includes a toner container 20, and the toner container 20 is filled with a toner 15. The toner 15 is supplied to the surface of the developing roller 16 by a toner supply roller 19, and a layer of the toner 15 having a predetermined thickness is formed on the surface of the developing roller 16 by the developing blade 21.

An electrophotographic apparatus according to one aspect of the present disclosure has at least one unit selected from the group consisting of the charging unit, the developing unit and the cleaning unit.

Figure 3:
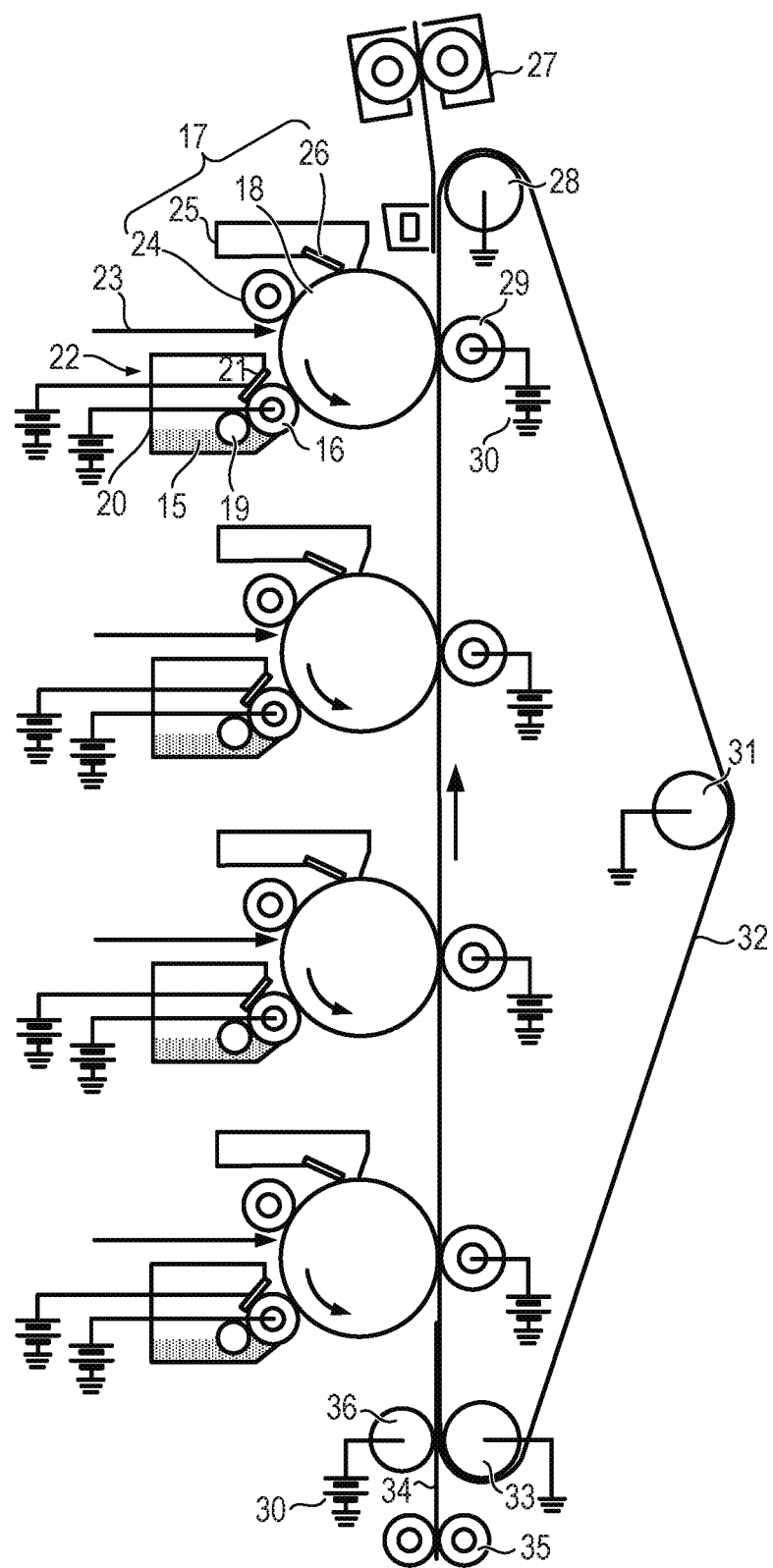
FIG. 3 illustrates a conceptual configuration diagram illustrating an electrophotographic apparatus according to one aspect of the present disclosure.

FIG. 3 illustrates a cross-sectional view illustrating an electrophotographic apparatus that uses a member for electrophotography according to one aspect of the present disclosure as the developing roller. In the electrophotographic apparatus of FIG. 3, the developing apparatus 22 is attachably/detachably mounted which includes the developing roller 16, the toner supply roller 19, the toner container 20 and the developing blade 21. The developing apparatus 22 is prepared for each color toner of yellow (Y), magenta (M), cyan (C) and black (Bk), and enables color printing.

In addition, the process cartridge 17 is attachably/detachably mounted which includes the electrophotographic photosensitive body 18, the cleaning blade 26, the waste toner storage container 25 and the charging roller 24. Alternatively, the electrophotographic photosensitive body 18, the cleaning blade 26, the waste toner storage container 25 and the charging roller 24 may be disposed in the main body of the electrophotographic apparatus.

The electrophotographic photosensitive body 18 rotates in the direction of the arrow, is uniformly electrically charged by the charging roller 24 for electrically charging the electrophotographic photosensitive body 18, and is irradiated with laser light 23 which is an exposing unit for writing an electrostatic latent image on the electrophotographic photosensitive body 18; and the electrostatic latent image is formed on the surface of the electrophotographic photosensitive body. The above described electrostatic latent image is developed by the developing apparatus 22 imparting the toner 15 thereto, which is arranged so as to come in contact with the electrophotographic photosensitive body 18, and becomes visualized as a toner image.

As for the development, the so-called reversal development is performed which forms the toner image on a portion exposed to light. The toner image that has been visualized on the electrophotographic photosensitive body 18 is transferred to the paper 34 which is a recording medium, by a transfer roller 29 which is a transfer member. The paper 34 is fed into the apparatus through a paper feed roller 35 and a suction roller 36, and is conveyed between the electrophotographic photosensitive body 18 and the transfer roller 29, by an endless belt type of transfer conveyance belt 32. The transfer conveyance belt 32 is operated by a driven roller 33, a driving roller 28 and a tension roller 31. A voltage is applied to the transfer roller 29 and the suction roller 36, from a bias power supply 30. The paper 34 to which the toner image has been transferred is subjected to fixing treatment in a fixing apparatus 27, and is discharged outside the apparatus; and the printing operation is completed.

On the other hand, the untransferred toner which has remained on the electrophotographic photosensitive body 18 without being transferred is scraped off by the cleaning blade 26 which is a cleaning member for cleaning the surface of the photosensitive body, and is stored in the waste toner storage container 25; and the cleaned electrophotographic photosensitive body 18 repeats the above described operation.

The developing apparatus 22 includes the toner container 20 which stores the toner 15 of a one-component developer, and the developing roller 16 which is positioned in an opening extending in the longitudinal direction of the toner container 20 and acts as a developer carrying body provided so as to face the electrophotographic photosensitive body 18. The developing apparatus 22 is configured so as to develop the electrostatic latent image on the electrophotographic photosensitive body 18 to visualize the image.

According to one aspect of the present disclosure, a member for electrophotography can be provided that contributes to the formation of a high-quality electrophotographic image.

In addition, according to another aspect of the present disclosure, an electrophotographic apparatus can be provided that can stably form a high-quality electrophotographic image.

Furthermore, according to still another aspect of the present disclosure, a process cartridge can be provided that contributes to a stable formation of a high-quality electrophotographic image.

EXAMPLES

Specific examples and Comparative Examples will be described below, but the present disclosure is not limited to these examples.

<Synthesis of Ion Conductive Agent>

The ion conductive agent to be used for obtaining a resin having a nitrogen-containing heterocyclic cation can be obtained, for example, by synthesizing a precursor by performing a nucleophilic substitution reaction such as Menshutkin reaction in one step or in a plurality of steps, and then by performing an ion exchange reaction.

A target ion conductive agent can be synthesized by changing a nucleophilic agent and an electrophilic agent which are used in the nucleophilic substitution reaction and an alkali metal which is used in the ion exchange reaction, to a desired combination.

<Synthetic Material of Ion Conductive Agents C-1 to C-5>

Materials were prepared that were shown in the following Tables 1 to 3, as the nucleophilic agent, the electrophilic agent and the ion exchange salt which were used in the synthesis of the ion conductive agents C-1 to C-5.

TABLE 1

| No. | Nucleophilic agent |
|---|---|
| N-1 | Imidazole (made by Kanto Chemical Co., Inc.) |
| N-2 | 2-Pyridine ethanol (made by Tokyo Chemical Industry Co., Ltd.) |
| N-3 | 1-Methyl imidazole (made by Tokyo Chemical Industry Co., Ltd.) |
| N-4 | 2-Hydroxymethyl imidazole (made by Sigma-Aldrich Co., LLC.) |
| N-5 | Pyrrolidine (made by Tokyo Chemical Industry Co., Ltd.) |
| N-6 | 1,4-Bis(3-aminopropyl) piperazine (made by Tokyo Chemical Industry Co., Ltd.) |

TABLE 2

| No. | Electrophilic agent |
|---|---|
| Q-1 | 2-Bromoethanol (made by Tokyo Chemical Industry Co., Ltd.) |
| Q-2 | 8-bromo-1-octanol (made by Tokyo Chemical Industry Co., Ltd.) |
| Q-3 | 2-[2-(2-chloroethoxy)ethoxy] ethanol (made by Tokyo Chemical Industry Co., Ltd.) |
| Q-4 | 6-Bromo-1-hexanol (made by Tokyo Chemical Industry Co., Ltd.) |
| Q-5 | Methyl iodide (made by Tokyo Chemical Industry Co., Ltd.) |
| Q-6 | Epichlorohydrin (made by Tokyo Chemical Industry Co., Ltd.) |

TABLE 3

| No. | Ion exchange salt |
|---|---|
| I-1 | Lithium bis(trifluoromethanesulfonyl) imide (made by Tokyo Chemical Co., Ltd.) |
| I-2 | Lithium bis(pentafluoroethanesulfonyl) imide (made by Tokyo Chemical Industry Co., Ltd.) |
| I-3 | Lithium bis(nonafluorobutanesulfonyl) imide (trade name: EF-N 442, made by Mitsubishi Materials Electronic Chemicals Co., Ltd.) |
| I-4 | Potassium N,N-hexafluoropropane-1,3-disulfonyl imide (trade name: EF-N 302, made by Mitsubishi Materials Electronic Chemicals Co., Ltd.) |
| I-5 | Lithium trifluoromethanesulfonate (made by Tokyo Chemical Industry Co., Ltd.) |

<Synthesis of Ion Conductive Agent C-1>

To an eggplant flask equipped with a Dimroth condenser, in which a stirrer was placed, 50 ml of tetrahydrofuran (THF) (made by Kanto Chemical Co., Inc.) was charged, 24.5 g (1.04 mol) of sodium hydride (made by Kanto Chemical Co., Inc.) was dispersed in the THF, and the eggplant flask was cooled in an ice bath.

Subsequently, a solution in which 17.0 g (0.25 mol) of nucleophilic agent No. "N-1" was dissolved in 100 ml of THF was added dropwise to the flask. After that, the ice bath was detached, and the above mixed liquid was stirred at room temperature (temperature of 23° C.) for 2 hours.

Next, 78.1 g (0.63 mmol) of electrophilic agent No. "Q-1" was added to the flask, and then was heated under reflux at a temperature of 70° C. for 8 hours to be reacted.

The reaction liquid was filtered, the insoluble matter was washed with THF, and the solvent of the obtained filtrate was distilled off under reduced pressure. The obtained concentrate was dissolved in dichloromethane again; the liquid was filtered; the filtrate was recovered; and the dichloromethane was distilled off under reduced pressure. The obtained concentrate was washed with diethyl ether and was dried under reduced pressure; and a precursor of the ion conductive agent C-1 was obtained.

Subsequently, the whole amount of the precursor of the ion conductive agent C-1 was dissolved in 100 ml of methanol. While the solution was stirred, 111.2 g of ion exchange salt No. "I-1" which was dissolved in 100 ml of pure water was added, and the mixed solution was stirred at room temperature for 24 hours. After the reaction, methanol was distilled off under reduced pressure, the resultant liquid was separated with dichloromethane/water, and then the organic layer was collected. The collected organic layer was washed twice with pure water, the solvent was distilled off under reduced pressure, the resultant was dried, and then the ion conductive agent C-1 was obtained which was white powder.

<Synthesis of Ion Conductive Agents C-2 to C-4 and C-8 to C-14>

The ion conductive agents C-2 to C-4 and C-8 to C-14 were synthesized in a similar way to that of the ion conductive agent C-1, except that the types and blended amounts of the nucleophilic agent, the electrophilic agent and the ion exchange salt were changed as described in Table 4.

TABLE 4

| Ion conductive agent No. | Nucleophilic agent No. | Added amount (g) | Electrophilic agent No. | Added amount (g) | Ion exchange salt No. | Added amount (g) |
|---|---|---|---|---|---|---|
| C-1 | N-1 | 17.0 | Q-1 | 78.1 | I-1 | 111.2 |
| C-2 | N-1 | 17.0 | Q-1 | 78.1 | I-2 | 150.0 |
| C-3 | N-1 | 17.0 | Q-1 | 78.1 | I-3 | 239.9 |
| C-4 | N-1 | 17.0 | Q-1 | 78.1 | I-4 | 128.3 |
| C-8 | N-1 | 17.0 | Q-2 | 130.6 | I-1 | 111.2 |
| C-9 | N-2 | 30.8 | Q-1 | 78.1 | I-1 | 111.2 |
| C-10 | N-2 | 30.8 | Q-1 | 78.1 | I-2 | 150.0 |
| C-11 | N-3 | 20.5 | Q-1 | 78.1 | I-1 | 111.2 |
| C-12 | N-4 | 24.5 | Q-1 | 78.1 | I-1 | 111.2 |
| C-13 | N-5 | 17.8 | Q-1 | 78.1 | I-1 | 111.2 |
| C-14 | N-5 | 17.8 | Q-1 | 78.1 | I-5 | 60.5 |

<Synthesis of Ion Conductive Agent C-5>

The following materials were added to a flask equipped with Dimroth condenser, and were heated overnight under reflux.

6.8 g (0.10 mol) of a nucleophilic agent N-1 (imidazole, made by Tokyo Chemical Industry Co., Ltd.)
  25.3 g (0.15 mol) of an electrophilic agent Q-3 (2-[2-(2-chloroethoxy)ethoxy]ethanol, made by Tokyo Chemical Industry Co., Ltd.)
  27.6 g (0.20 mol) of potassium carbonate (made by Kanto Chemical Co., Inc.)
  200 ml of acetone After the reaction, the reaction liquid was filtered, and the solvent of the filtrate was distilled off under reduced pressure. After that, the resultant liquid was purified by silica gel column chromatography (ethyl acetate), and such a chemical compound was obtained that the nucleophilic agent was tertiarized. Subsequently, the obtained chemical compound was dissolved in 50 ml of dichloromethane, 18.8 g (0.20 mol) of Q-1 (2-bromo-ethanol, made by Tokyo Chemical Industry Co., Ltd.) which was the electrophilic agent was added, and the mixed liquid was heated under reflux at 40° C. for 20 hours. After the reaction, the solution was distilled off under reduced pressure; the resultant was washed with diethyl ether, and was dried under reduced pressure; and a quaternized ion conductive agent precursor was obtained. Subsequently, in order to convert the anion into a target anion, the whole amount of the obtained ion conductive agent precursor was dissolved in 100 ml of methanol at room temperature. While the solution was stirred, 43.1 g of an ion exchange salt I-1 (lithium bis(trifluoromethanesulfonyl) imide, made by Kanto Chemical Co., Inc.) was added which was dissolved in 50 ml of pure water, and the mixed liquid was stirred at room temperature for 24 hours. After the reaction, methanol in the solution was distilled off under reduced pressure, the resultant liquid was separated with dichloromethane/water, and then the organic layer was collected. The collected liquid was washed twice with pure water, the solvent was distilled off under reduced pressure, the resultant was dried, and an ion conductive agent C-5 was obtained which was white powder.

<Synthesis of Ion Conductive Agents C-6 and C-7>

C-6 and C-7 were obtained in a similar way to that in the synthesis of the ion conductive agent C-5, except that the types and the blended amounts of the nucleophilic agent and the electrophilic agent which were raw materials were changed as described in Table 5.

TABLE 5

| Ion conductive agent No. | Nucleophilic agent | | Electrophilic agent for tertiarization | | Electrophilic agent for quaternization | | Ion exchange salt | |
|---|---|---|---|---|---|---|---|---|
| | No. | Added amount (g) | No. | Added amount (g) | No. | Added amount (g) | No. | Added amount (g) |
| C-5 | N-1 | 6.8 | Q-3 | 25.3 | Q-1 | 18.8 | I-1 | 43.1 |
| C-6 | N-1 | 6.8 | Q-4 | 27.2 | Q-1 | 18.8 | I-1 | 43.1 |
| C-7 | N-1 | 6.8 | Q-2 | 31.4 | Q-1 | 18.8 | I-1 | 43.1 |

<Synthesis of Ion Conductive Agent C-15>

A stirrer and 50 ml of THF were charged into an eggplant flask equipped with a Dimroth condenser, and 20.0 g (0.10 mol) of N-6 (1,4-bis(3-aminopropyl) piperazine, made by Tokyo Chemical Industry Co., Ltd.) of the nucleophilic agent was dissolved therein. After the inside of the eggplant flask was replaced with nitrogen and was cooled with ice, 35.5 g (0.25 mol) of an electrophilic agent Q-5 (methyl iodide, made by Tokyo Chemical Industry Co., Ltd.) which was dissolved in 100 ml of THF was added dropwise over 30 minutes, and was heated under reflux at 40° C. for 20 hours. After the reaction, 100 ml of pure water was added, and the solvent was distilled off under reduced pressure. After that, the resultant substance was dissolved in 100 ml of ethanol at room temperature; unnecessary substances were removed by Celite filtration; then the solvent was distilled off under reduced pressure again; and an ion conductive precursor was obtained.

Subsequently, in order to convert the anion into a target anion, the whole amount of the obtained ion conductive agent precursor was dissolved in 100 ml of methanol at room temperature. While the solution was stirred, 17.3 g of the ion exchange salt I-1 (lithium bis(trifluoromethanesulfonyl) imide, made by Kanto Chemical Co., Inc.) was added which was dissolved in 50 ml of pure water, and the mixed liquid was stirred at room temperature for 24 hours. After the reaction, methanol in the solution was distilled off under reduced pressure, the resultant liquid was separated with dichloromethane/water, and then the organic layer was collected. The collected liquid was washed twice with pure water, the solvent was distilled off under reduced pressure, the resultant was dried, and an ion conductive agent C-15 was obtained which was white powder.

<Synthesis of Ion Conductive Agent C-16>

A stirrer and 100 ml of dichloromethane (made by Tokyo Kasei Kogyo Co., Ltd.) were charged into an eggplant flask equipped with a Dimroth condenser, and 17.0 g (0.25 mol) of the nucleophilic agent N-1 (imidazole, made by Tokyo Chemical Industry Co., Ltd.) was dissolved therein. An electrophilic agent Q-6 (epichlorohydrin, made by Tokyo Chemical Industry Co., Ltd.) in an amount of 50.9 g (0.55 mol), which was dissolved in 100 ml of dichloromethane, was added dropwise over 30 minutes at room temperature, and then the resultant liquid was heated under reflux at 50° C. for 7 hours. After the resultant liquid was cooled to room temperature, 300 ml of 5 mass % aqueous solution of sodium carbonate was added thereinto, and the mixed liquid was stirred for 30 minutes. The reaction liquid was separated, the dichloromethane layer was washed twice with pure water, the solvent was distilled off under reduced pressure, and an ion conductive agent precursor was obtained.

The obtained precursor was dissolved in 75.0 g of acetone, then 69.6 g of the ion exchange salt I-1 (lithium bis(trifluoromethanesulfonyl) imide made by Kanto Chemical Co., Inc.) which was dissolved in 150.0 g of pure water was added dropwise over 30 minutes, and the resultant liquid was stirred at 30° C. for 2 hours. The obtained solution was separated, the organic layer was washed three times with pure water, then acetone was distilled off under reduced pressure, and an ion conductive agent C-16 was obtained.

The structures of the obtained ion conductive agents are shown below.

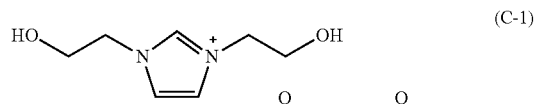

(C-1)

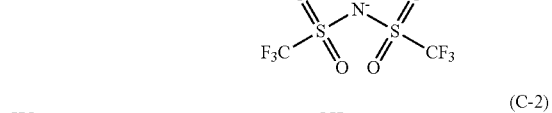

(C-2)

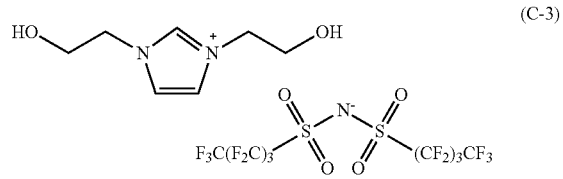

(C-3)

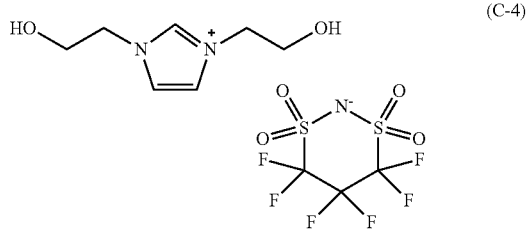

(C-4)

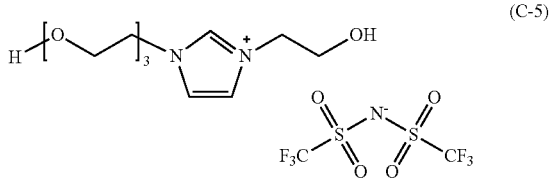

(C-5)

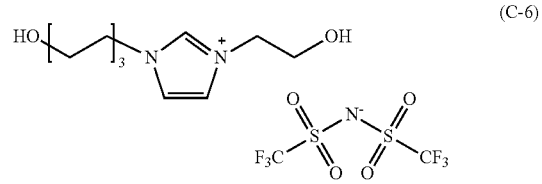

(C-6)

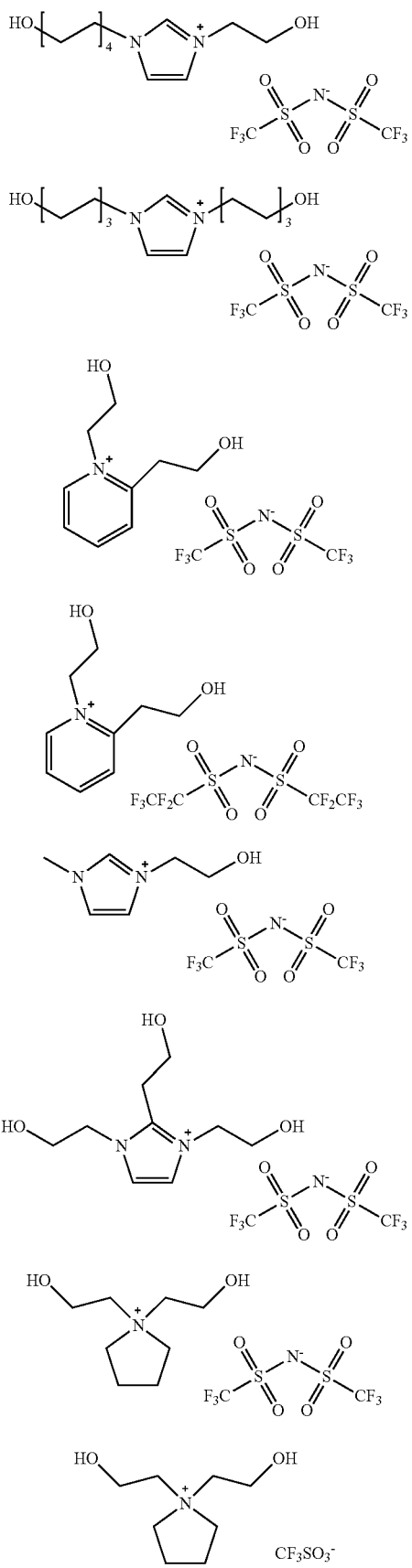

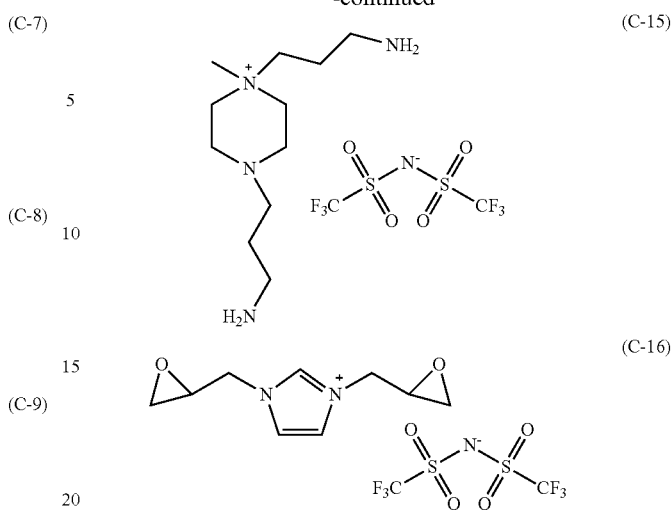

<Preparation of Polyol>
<<The Following Chemical Compounds were Prepared as Polyols A-1 to A-3>>

TABLE 6

| Polyol | |
|---|---|
| Poly(propylene glycol) (trade name: PPG 2000: made by FUJIFILM Wako Pure Chemical Corporation) | A-1 |
| Polyhexamethylene adipate-based polyol (trade name: Nipporan 4073: made by Tosoh Corporation) | A-2 |
| Polyether polyol (trade name: Actcol EP 550N: made by Mitsui Chemicals, Inc.) | A-3 |

<Preparation of Isocyanate Compound as Curing Agent>
<<Synthesis of Isocyanate Group-Terminated Urethane Prepolymer B-1>>

To 46.3 parts by mass of polymeric MDI (trade name: Millionate MR 200, made by Tosoh Corporation) in a reaction container, 100 parts by mass of polypropylene glycol (trade name: polypropylene glycol 2000, made by FUJIFILM Wako Pure Chemical Corporation) was gradually added dropwise. The liquid was added dropwise in a nitrogen atmosphere while the temperature inside the reaction container was kept at 65° C.

After the completion of the dropwise addition, the mixture was reacted at a temperature of 65° C. for 2 hours. The obtained reaction mixture was cooled to room temperature, and was diluted with 60 parts by mass of methyl ethyl ketone (MEK), and 202.5 g of an isocyanate group-terminated urethane prepolymer B-1 was obtained of which the content of the isocyanate group was 4.3%.

<<Preparation of Curing Agents B-2 and B-3>>
The following isocyanate compounds were prepared as curing agents B-2 and B-3, respectively.

TABLE 7

| Curing agent | |
|---|---|
| Isocyanate group-terminated prepolymer | B-1 |
| Polymeric MDI (trade name: Millionate MR 400: made by Tosoh Corporation) | B-2 |
| Isocyanate (mixture of MDI and TDI) (trade name: Cosmonate TM 20: made by Mitsui Chemicals, Inc.) | B-3 |

<Preparation of Carbon Black>
<<Preparation of Carbon Blacks E-1 to E-12>>
The following carbon blacks were prepared as carbon blacks E-1 to E-12.

TABLE 8

| Carbon black | |
|---|---|
| SUNBLACK X 55 (made by TOKAI CARBON CO., LTD.) | E-1 |
| Toka Black #7360SB (made by ASAHI CARBON CO., LTD.) | E-2 |
| #25 (made by Mitsubishi Chemical Corporation) | E-3 |
| #50 (made by Mitsubishi Chemical Corporation) | E-4 |
| REAGAL 350 (made by Cabot Corporation) | E-5 |
| Printex 35 (made by Orion Engineered Carbons) | E-6 |
| Special black 250 (made by Orion Engineered Carbons) | E-7 |
| #32 (made by Mitsubishi Chemical Corporation) | E-8 |
| SUNBLACK X 65 (made by ASAHI CARBON CO., LTD) | E-9 |
| MA 230 (made by Mitsubishi Chemical Corporation) | E-10 |
| MA 100 (made by Mitsubishi Chemical Corporation) | E-11 |
| Toka Black #4500 (made by TOKAI CARBON CO., LTD.) | E-12 |

<<Developing Roller>>

Example 1

(Production of Elastic Roller D-1)
A cored bar which was made from stainless steel (SUS 304) and had a diameter of 6 mm was coated with a primer (trade name: DY 35-051, made by Dow Corning Toray Co., Ltd.), then was baked for 20 minutes in an oven which was heated to a temperature of 180° C., and was prepared as a substrate.

As for a liquid material for forming the elastic layer, 15 parts by mass of carbon black (trade name Toca Black #4500, made by Tokai Carbon Co., Ltd.) were dispersed in 100 parts by mass of a liquid silicone rubber material (trade name SF 6905A/B, made by Dow Corning Toray Co., Ltd.). The substrate was placed in a mold, and the cavity formed in the mold was filled with the liquid material; and the resultant mold was heated for 20 minutes in an oven which was heated to a temperature of 140° C.; and the liquid material was cured. After the mold was cooled, the shaft core body having the silicone rubber layer formed thereon was removed from the mold, and was heated for 3 hours in an oven which was heated to a temperature of 190° C.; and the curing reaction of the silicone rubber was completed. The elastic roller D-1 was produced which had a silicone rubber elastic layer having a diameter of 12 mm formed on the outer circumference of the substrate.

(Preparation of Paint for Forming Electro-Conductive Layer)
The following materials were stirred and mixed as a paint for forming the electro-conductive layer.
52.3 parts by mass of polyol A-1 (trade name: PPG 2000, made by FUJIFILM Wako Pure Chemical Corporation)
94.2 parts by mass of isocyanate group-terminated urethane prepolymer B-1
3.64 parts by mass of ion conductive agent C-1
3.64 parts by mass of carbon black E-1 (trade name: SUNBLACK X 55, made by Asahi Carbon Co., Ltd.)
12.2 parts by mass of fine particle of urethane resin (trade name: Art Pearl C-800T, made by Negami Chemical Industries Co., Ltd.) of a roughening particle Next, MEK was added thereto so that the total solid content ratio became 25% by mass, and then the mixture was mixed by a sand mill. Subsequently, furthermore, the viscosity was adjusted to 10 to 12 cps with MEK, and a paint for forming an electro-conductive layer was prepared.

The previously produced elastic roller D-1 was immersed in the paint, and the paint film of the paint was formed on the surface of the elastic layer of the elastic roller D-1, and was dried. The resultant elastic roller D-1 was further subjected to heat treatment at a temperature of 150° C. for 1 hour, thereby an electro-conductive layer having a film thickness of 15 μm was provided on the outer circumference of the elastic layer, and a developing roller according to Example 1 was produced.

A structure of a nitrogen-containing heterocyclic cation contained in Example 1 is shown in Structure Formula (10). The wavy line indicates that the portion is bonded to a skeleton of the urethane resin.

Structural Formula (10)

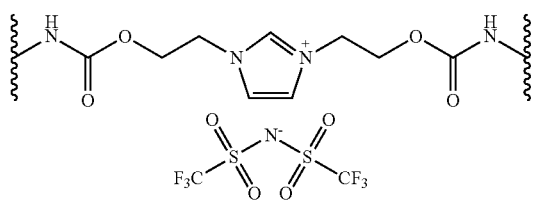

On the obtained developing roller according to Example 1, the following items were evaluated. The results of the evaluation of the developing roller are shown in Table 12.

<Collection of Carbon Black Contained in Electro-Conductive Layer>
To a flask equipped with a Dimroth, 32 g of the electro-conductive layer which was peeled from the developing roller according to Example 1, 320 ml of diethanolamine (made by Tokyo Chemical Industry Co., Ltd.) which was a decomposing agent, and 1.5 ml of pure water were added, and the mixture was heated under reflux at 160° C. for 20 hours while being stirred. To the solution after the reaction, 300 ml of MEK was added, and the mixed solution was centrifuged. An obtained substance was further washed twice with 200 ml of MEK, was centrifuged, and then was dried under reduced pressure; and 1.4 g of carbon black contained in 32 g of the electro-conductive layer was obtained.

<Evaluation of DBP Absorption Number>
The DBP absorption number of the carbon black contained in the electro-conductive layer was measured according to the rules of JIS K6217-4 "carbon black for rubber—basic characteristics—Part 4: Method for determining DBP absorption number".

<Evaluation of CTAB Adsorption Specific Surface Area>
The CTAB adsorption specific surface area of the carbon black contained in the electro-conductive layer was measured according to the prescription of JIS K6217-3 "Carbon Black for Rubber—Basic characteristics—Part 3: Method for determining specific surface area—CTAB adsorption method".

<Evaluation of Volatile-Matter Content>
The volatile-matter content of the carbon black contained in the electro-conductive layer was measured according to the prescription of JIS K6221 (1982) "Testing method for carbon black for rubber".

<Calculation of YZ/X>
Measurement of the Mass of the Anion Contained in the Electro-Conductive Layer
Into a closed container of 200 ml, 50 ml of methanol (made by Kanto Chemical Co., Inc. for high performance liquid chromatography), 50 ml of pure water and 0.5 g of lithium bromide (made by Tokyo Chemical Industry Co., Ltd.) were added, which was completely dissolved. After that, 40 µl of the solution was taken out, and was diluted with 2 ml of acetonitrile; and a standard sample was prepared.

Next, 32 g of the electro-conductive layer which was peeled from the developing roller according to Example 1 was added to the 100 ml of the solution which was prepared earlier, and was immersed therein for 24 hours while the solution was stirred. The solution in which the electro-conductive layer was immersed was collected and filtered, then 20 µl of the filtrate was diluted with 1 ml of acetonitrile, and an analysis sample was prepared.

Subsequently, in order to draw a calibration curve, a reference solution was diluted stepwise to 100 ppm, 75 ppm, 50 ppm and 25 ppm, the concentrations were measured under the following conditions with the use of LC/MS, and the calibration curve of the bromide ion was prepared.

Column: Acclaim Trinity P1, 2.1×100 mm and 3 µm,
/Mobile Phase: ACN/HCOONH$_4$ (20 mM and pH 4.9)=75/25 (V/V)
Temperature: 30° C.
Flow rate: 0.5 mL/min
Inj. Volume: 2 µL
Detection: Corona Veo (Neb Temp=50° C. and 100 HZ/3.6 s)

The standard sample which was prepared earlier and an analysis sample were measured under similar conditions to those of the samples for preparing the calibration curve, and the concentration of the bromide ion was calculated from the previously prepared calibration curve. In addition, a molecular weight of an anion other than the bromide ion (anion obtained by elution) was obtained, which was contained in the analysis sample.

Because the anion of lithium bromide and the anion contained in the electro-conductive layer are exchanged by an extraction operation, the same amount of the bromide ion as the amount of anions contained in the electro-conductive layer is consumed. Then, the anion concentration in the analysis sample was obtained with the use of the following Expression (2), and the mass of the anion contained in the electro-conductive layer was calculated. In the following Expression (2), the concentration of the bromide ion in the standard sample is represented by $\alpha i$ (g/l), the concentration of the bromide ion in the analysis sample is represented by $\alpha f$ (g/l), and the molecular weight of the detected anion is represented by M (g/mol).

$$\frac{(\alpha i - \alpha f) \times 0.1}{79.9} \times M \qquad \text{Expression (2)}$$

The amount of the anion contained in the electro-conductive layer 32 g of the developing roller according to Example 1 was 0.566 g, which was determined according to the above.

With the use of the calculated mass of the anion, and the mass and the CTAB adsorption specific surface area of the carbon black, YZ/X was determined which was the ratio of the total CTAB adsorption specific surface area of the carbon black to the anion contained in the electro-conductive layer.

<Evaluation of Relaxation Time>

Figure 4:
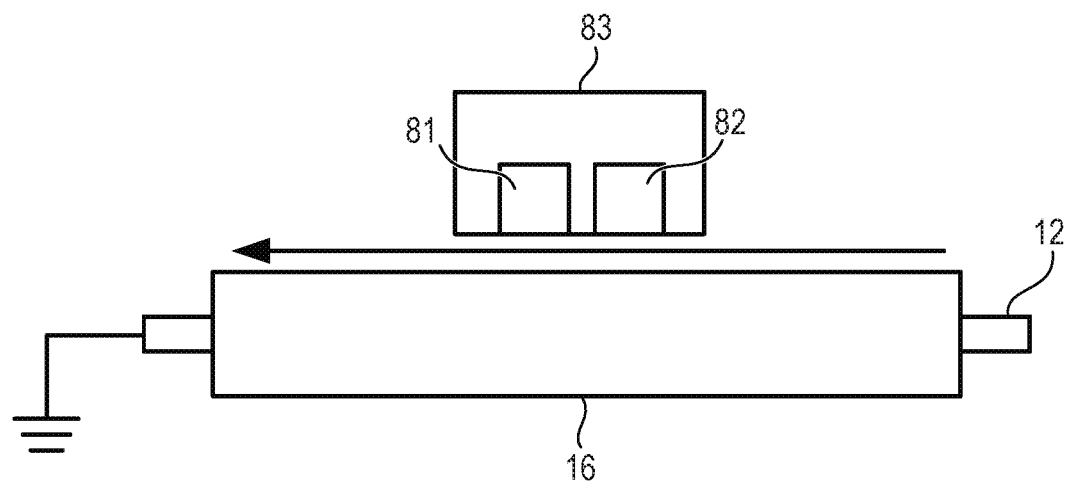
FIG. 4 is a schematic configuration diagram of a measuring apparatus which measures a relaxation time of a conductive roller which is a member for electrophotography according to one aspect of the present disclosure.

The electric charge of the developing roller according to Example 1 was attenuated by the following method. As the evaluation apparatus, DRA-2000L (trade name, made by Quality Engineering Associates Inc.) was used. The outline of this apparatus will be described below with reference to FIG. 4. The apparatus is equipped with a head 83 in which a corona discharger 81 and a probe 82 of a surface potential meter are integrated. In addition, because the distance from the position at which the electric discharge is performed by the corona discharger in the head 83 to the center of a probe of the surface potential meter is 25 mm, a delay time is generated in between the end of the discharge and the measurement, which depends on the movement speed of the head. This head 83 can move parallel to the longitudinal direction of the installed developing roller 16. In addition, the electric charge generated in the corona discharger 81 is emitted toward the surface of the developing roller 16.

After the corona discharge was performed, the head 83 is moved to the discharge point. The measurement is conducted in the following manner.

(1) The electric charge is emitted from the corona discharger 81 to the surface of the developing roller 16.

(2) During the delay time occurring before the probe 82 of the surface potential meter moves to the measurement position, the charge on the surface of the developing roller 16 flows to the ground through the electro-conductive substrate 12.

(3) The probe 82 of the surface potential meter is stopped at the measurement position, and the change of the residual electric charge on the surface of the developing roller 16 with respect to a time period is measured with the potential meter.

This evaluation apparatus and the developing roller according to Example 1 were left in an environment of 0° C. for 24 hours or longer, and the measurement was performed in the environment.

A master made from SUS 304 having the same outer diameter as the developing roller according to Example 1 was installed in DRA-2000L, and this master was short-circuited to the ground. Subsequently, the distance between the master surface and the probe of the surface potential meter was adjusted to 0.76 mm, and the surface potential meter was calibrated so as to become zero. After the calibration, the master was removed, and the developing roller to be measured was installed in the DRA-2000L.

As for the measurement conditions, the bias of the corona discharger was set at 8 kV, the moving speed of the head 83 was set at 400 mm/sec, and the measurement time of the potential was set at 10 seconds. In the present measurement condition, the delay time occurring before the probe 82 of the surface potential meter moves to the measurement position is 0.0625 seconds. Because of this, the potential which was obtained after 0.0625 seconds after the corona discharge was determined to be the initial potential. Furthermore, the potential was measured for 10 seconds and an attenuation curve was obtained. A time period for the potential to reach 1/e of the initial potential was calculated therefrom, and was determined to be the relaxation time.

The measurement points were determined to be arbitrary three points in a central portion excluding ranges of 27.5 mm from both ends of the elastic layer, and the average value of the three points was used.

<Evaluation of Fogging>

After the above described measurement, in the same environment, a cyan cartridge which incorporated the developing roller according to Example 1 therein was charged into an evaluation machine that was an HP laser printer (trade name: HP Laser Jet Enterprise Color M553dn) which was modified so that the discharging speed became 60 sheets/minute; and thereby the fogging was evaluated.

After an image with a printing rate of 1% was output, a white solid image was output. The printer was stopped on the way of outputting the white solid image, the developer having adhered to the photosensitive body was peeled off with a tape (trade name: CT18, made by Nichiban Co., Ltd.), and the reflectance was measured with a reflection densitometer (trade name: TC-6DS/A, made by Tokyo Denshoku Co., Ltd.). The decrease amount (%) of the reflectance with reference to the reflectance of the tape was measured, and was determined to be a fogging value.

A fogging value which was measured after the output of 100 sheets of images with a printing rate of 1% was determined to be an initial fogging value, and a fogging value which was measured after the output of 15,000 sheets was determined to be a fogging value after a durability test.

<Relaxation Time after Durability Test>

The fogging was evaluated after the durability test, then the developing roller which was charged in the cartridge was taken out, and the developer remaining on the surface of the developing roller was removed by air blow. After that, in a similar way to that of the evaluation of the attenuation of the developing roller, the relaxation time after the durability test was calculated.

Examples 2 to 19

The developing rollers according to Examples 2 to 19 were produced in a similar way to that in Example 1, except that the types and used amounts of the polyol, the curing agent, the ion conductive agent, the carbon black and the roughening particle which were used in the production of the developing roller were changed as shown in Table 9.

Comparative Examples 1 to 9

The developing rollers according to Comparative Examples 1 to 9 were produced in a similar way to that in Example 1, except that the types and used amounts of the polyol, the curing agent, the ion conductive agent, the carbon black and the roughening particle which were used in the production of the developing roller were changed as shown in Table 10.

TABLE 9

| | | Polyol | | Curing agent | | Ion conductive agent | | Carbon black | | | | Roughening particle | |
|---|---|---|---|---|---|---|---|---|---|---|---|---|---|
| | | No. | Part by Mass | No. | Part by Mass | No. | Part by Mass | No. | Part by Mass | No. | Part by Mass | No. | Part by Mass |
| Example | 1 | A-1 | 50.5 | B-1 | 95.4 | C-1 | 4.22 | E-1 | 6.7 | — | — | Artpeal | 12.2 |
| | 2 | | 54.2 | | 80.9 | | 1.11 | | 16.6 | — | — | artpeal | 11.2 |
| | 3 | | 52.2 | | 75.0 | | 0.60 | | 24.6 | — | — | C800T | 10.5 |
| | 4 | | 55.0 | | 80.1 | | 0.80 | E-2 | 6.4 | E-3 | 9.7 | | 11.2 |
| | 5 | | 54.3 | | 81.1 | | 1.11 | E-4 | 11.1 | E-5 | 5.6 | | 11.2 |
| | 6 | | 55.0 | | 80.1 | | 0.80 | E-2 | 4.3 | | 12.7 | | 11.2 |
| | 7 | | 50.0 | | 96.1 | | 4.44 | E-4 | 6.0 | — | — | | 12.2 |
| | 8 | | 50.4 | | 79.4 | | 1.70 | | 21.8 | — | — | | 10.8 |
| | 9 | | 54.7 | | 78.1 | | 0.55 | | 18.9 | — | — | | 11.0 |
| | 10 | | 53.5 | | 79.7 | C-2 | 1.31 | | 18.7 | — | — | | 11.1 |
| | 11 | | 50.8 | | 77.8 | C-16 | 1.42 | E-1 | 17.7 | — | — | | 10.7 |
| | 12 | | 50.8 | | 78.4 | C-13 | 1.46 | | 21.8 | — | — | | 10.7 |
| | 13 | | 48.0 | | 73.4 | C-2 | 1.54 | E-2 | 28.9 | — | — | | 10.1 |
| | 14 | | 48.0 | | 81.2 | C-14 | 1.94 | E-1 | 24.1 | — | — | | 10.7 |
| | 15 | | 51.3 | | 78.9 | C-15 | 1.61 | | 21.3 | — | — | | 10.8 |
| | 16 | | 46.3 | | 99.5 | C-1 | 5.80 | | 6.1 | — | — | | 12.2 |
| | 17 | | 49.8 | | 71.1 | | 0.50 | | 29.9 | — | — | | 10.0 |
| | 18 | | 46.3 | | 99.5 | | 5.80 | E-4 | 5.8 | — | — | | 12.2 |
| | 19 | | 49.8 | | 71.1 | | 0.50 | | 29.9 | — | — | | 10.0 |

TABLE 10

| | | Polyol | | Curing agent | | Ion conductive agent | | Carbon black | | | | Roughening particle | |
|---|---|---|---|---|---|---|---|---|---|---|---|---|---|
| | | No. | Part by Mass | No. | Part by Mass | No. | Part by Mass | No. | Part by Mass | No. | Part by Mass | No. | Part by Mass |
| Comparative Example | 1 | A-1 | 54.3 | B-1 | 81.0 | C-3 | 1.11 | E-6 | 16.6 | — | — | Artpeal | 11.2 |
| | 2 | | | | | | | E-7 | | — | — | artpeal | |
| | 3 | | | | | | | E-8 | | — | — | C800T | |
| | 4 | | | | | | | E-9 | | — | — | | |
| | 5 | | | | | | | E-10 | | — | — | | |
| | 6 | | | | 80.2 | C-15 | | | | — | — | | |
| | 7 | | 53.5 | | 82.0 | C-14 | | E-11 | | — | — | | |
| | 8 | | 54.7 | | 80.3 | C-2 | | E-12 | | — | — | | |
| | 9 | | | | 81.3 | C-16 | 1.12 | | 16.7 | — | — | | 11.3 |
| | 10 | | 57.3 | | 78.2 | — | — | E-1 | 16.6 | — | — | | 11.2 |
| | 11 | | 61.6 | | 92.0 | C-1 | 1.26 | — | — | — | — | | 12.7 |

The developing rollers according to Examples 2 to 19 and Comparative Examples 1 to 11 were evaluated in a similar way to that in Example 1. Evaluation results are shown in Tables 11 to 13.

TABLE 11

|  |  | Example 1 | Example 2 | Example 3 | Example 4 | Example 5 | Example 6 |
|---|---|---|---|---|---|---|---|
| Cation skeleton |  | Imidazolium | | | | | |
| Nitrogen-containing heterocyclic structure |  | Z-1 | Z-1 | Z-1 | Z-1 | Z-1 | Z-1 |
| Anion |  | $(C_3F_5SO_2)_2N^-$ | | | | | |
| DBP absorption number (ml/100 g) |  | 75 | 76 | 75 | 75 | 60 | 60 |
| CTAB adsorption specific surface area (m$^2$/g) |  | 85 | 85 | 84 | 60 | 85 | 60 |
| Volatile-matter content (%) |  | 2.0 | 2.1 | 2.0 | 2.0 | 2.0 | 2.0 |
| YZ/X |  | 210 | 1990 | 5400 | 1990 | 1990 | 1990 |
| Initial stage | Relaxation | 7.8E−02 | 7.8E−02 | 7.8E−02 | 7.7E−02 | 7.8E−02 | 7.8E−02 |
| After durability test | time (s) | 7.9E−02 | 7.9E−02 | 7.9E−02 | 7.8E−02 | 7.9E−02 | 7.9E−02 |
| Initial stage | Fogging | 0.8 | 0.9 | 0.8 | 0.8 | 0.9 | 0.8 |
| After durability test | (%) | 1.1 | 1.0 | 1.1 | 1.0 | 1.1 | 1.0 |

|  |  | Example 7 | Example 8 | Example 9 | Example 10 | Example 11 |
|---|---|---|---|---|---|---|
| Cation skeleton |  | Imidazolium | | | | |
| Nitrogen-containing heterocyclic structure |  | Z-1 | Z-1 | Z-1 | Z-1 | Z-3 |
| Anion |  | $(C_3F_5SO_2)_2N^-$ | | | $(C_2F_5SO_2)_2N$ | $(CF_3SO_2)_2N$ |
| DBP absorption number (ml/100 g) |  | 66 | 65 | 65 | 66 | 75 |
| CTAB adsorption specific surface area (m$^2$/g) |  | 100 | 99 | 100 | 99 | 85 |
| Volatile-matter content (%) |  | 1.5 | 1.5 | 1.5 | 1.5 | 2.0 |
| YZ/X |  | 210 | 1990 | 5400 | 1990 | 1990 |
| Initial stage | Relaxation | 8.2E−02 | 8.2E−02 | 8.1E−02 | 8.1E−02 | 8.1E−02 |
| After durability test | time (s) | 8.4E−02 | 8.4E−02 | 8.4E−02 | 8.3E−02 | 8.3E−02 |
| Initial stage | Fogging | 1.0 | 1.1 | 1.1 | 1.2 | 1.1 |
| After durability test | (%) | 1.2 | 1.2 | 1.3 | 1.4 | 1.2 |

TABLE 12

|  |  | Example 12 | Example 13 | Example 14 | Example 15 | Example 16 | Example 17 | Example 18 | Example 19 |
|---|---|---|---|---|---|---|---|---|---|
| Cation skeleton |  | Pyrrolidinium | Imidazolium | Pyrrolidinium | Piperazinium | Imidazolium | | | |
| Nitrogen-containing heterocyclic structure |  |  | Z-1 |  | Z-2 | Z-1 | | | |
| Anion |  | $(CF_3SO_2)_2N^-$ | $(C_2F_5SO_2)_2N^-$ | $CF_3SO_3^-$ |  |  | $(CF_3SO_2)_2N^-$ | | |
| DBP absorption number (ml/100 g) |  | 75 | 90 | 75 | 75 | 75 | 76 | 65 | 66 |
| CTAB adsorption specific surface area (m$^2$/g) |  | 85 | 75 | 85 | 85 | 85 | 85 | 100 | 100 |
| Volatile-matter content (%) |  | 2.0 | 1.0 | 2.1 | 2.0 | 2.0 | 2.0 | 1.5 | 1.5 |
| YZ/X |  | 1990 | 1990 | 1990 | 1990 | 132 | 7960 | 156 | 9364 |
| Initial stage | Relaxation | 8.1E−02 | 8.2E−02 | 8.2E−02 | 8.1E−02 | 8.1E−02 | 8.1E−02 | 8.2E−02 | 8.2E−02 |
| After durability test | time (s) | 8.7E−02 | 9.0E−02 | 9.2E−02 | 8.6E−02 | 9.4E−02 | 9.6E−02 | 9.7E−02 | 9.7E−02 |
| Initial stage | Fogging | 1.2 | 1.1 | 1.2 | 1.2 | 1.1 | 1.2 | 1.1 | 1.1 |
| After durability test | (%) | 1.7 | 1.9 | 2.1 | 1.6 | 2.3 | 2.4 | 2.3 | 2.4 |

TABLE 13

|  | Comparative Example 1 | Comparative Example 2 | Comparative Example 3 | Comparative Example 4 | Comparative Example 5 | Comparative Example 6 |
|---|---|---|---|---|---|---|
| Cation skeleton | Imidazolium | | | | Pyrrolidinium | Piperazinium |
| Nitrogen-containing heterocyclic structure | Z-1 | | | | | Z-2 |
| Anion | $(CF_3SO_2)_2N^-$ | | | | | |

TABLE 13-continued

| | | | | | | |
|---|---|---|---|---|---|---|
| DBP absorption number (ml/100 g) | | 41 | 46 | 100 | 68 | 114 | 114 |
| CTAB adsorption specific surface area (m²/g) | | 65 | 40 | 83 | 105 | 74 | 74 |
| Volatile-matter content (%) | | 0.5 | 2.0 | 0.6 | 3.0 | 1.5 | 1.5 |
| YZ/X | | 1522 | 936 | 1943 | 2458 | 1741 | 1962 |
| Initial stage | Relaxation | 1.9E−01 | 1.9E−01 | 1.9E−01 | 2.0E−01 | 2.0E−01 | 2.0E−01 |
| After durability test | time (s) | 2.1E−01 | 2.1E−01 | 2.2E−01 | 2.3E−01 | 2.4E−01 | 2.4E−01 |
| Initial stage | Fogging | 5.2 | 5.3 | 5.1 | 4.8 | 5.5 | 5.4 |
| After durability test | (%) | 6.3 | 6.2 | 6.4 | 6.0 | 6.5 | 6.6 |

| | | Comparative Example 7 | Comparative Example 8 | Comparative Example 9 | Comparative Example 10 | Comparative Example 11 |
|---|---|---|---|---|---|---|
| Cation skeleton | | Pyrrolidinium | Imidazolium | | | Imidazolium |
| Nitrogen-containing heterocyclic structure | | Z-1 | | Z-3 | | 1 |
| Anion | | $CF_3SO_3^-$ | $(C_2F_5SO_2)_2N^-$ | $(CF_3SO_2)_2N^-$ | | $(CF_3SO_2)_2N^-$ |
| DBP absorption number (ml/100 g) | | 101 | 172 | 172 | 78 | |
| CTAB adsorption specific surface area (m²/g) | | 110 | 56 | 56 | 83 | |
| Volatile-matter content (%) | | 0.7 | 0.6 | 0.6 | 2.0 | |
| YZ/X | | 3107 | 1187 | 1383 | | |
| Initial stage | Relaxation | 2.0E−01 | 2.0E−01 | 1.9E−01 | 2.0E−01 | 1.1E−01 |
| After durability test | time (s) | 2.3E−01 | 2.2E+00 | 2.2E+00 | 2.3E−01 | 1.6E−01 |
| Initial stage | Fogging | 5.7 | 5.4 | 5.5 | 4.7 | 2.1 |
| After durability test | (%) | 6.4 | 6.4 | 6.5 | 5.1 | 4.1 |

Comparative Examples 1 to 4 have the same nitrogen-containing heterocyclic cation structure and anion as in Example 1. However, either the DBP absorption number or the CTAB adsorption specific surface area of the contained carbon black was not in the range of 45 ml/100 g or more and 90 ml/100 g or less, or 50 m²/g or more and 100 m²/g or less, respectively.

In Comparative Example 1 of which the DBP absorption number of the carbon black was smaller than 45 ml/100 g and in Comparative Example 2 of which the CTAB adsorption specific surface area of the carbon black was smaller than 50 m²/g, the relaxation time of the electric charge was almost the same as that of Comparative Example 11 which did not contain the carbon black. Because of this, the effect of having added the carbon black was not obtained.

In addition, in Comparative Examples 1, 2 and 11, the relaxation time was short compared to those of Comparative Examples 3 and 4, but was longer than that of Example 1. Furthermore, in the evaluation method of having evaluated the fogging by an evaluation machine which was modified so that the printing speed became 60 sheets/minute, the fogging after the durability test was 4% or more, which was larger than that of Example 1. This is considered to be because the number of revolutions of the developing roller per unit time increased due to a printing speed which was made higher, thereby the relaxation of the electric charge could not catch up, and the electric charges were superimposed on the electro-conductive layer of the developing roller.

In Comparative Examples 3 and 8 in which the carbon black contained in the electro-conductive layer had a DBP absorption number larger than 90 ml/100 g, the relaxation time became longer from the initial stage than that of Example 1. This is considered to be because the DBP absorption number of the carbon black was large, the amount of the resin increased which had the nitrogen-containing heterocyclic cation structure to be adsorbed by the carbon black, consequently also the anion which was restricted by the cation resulted in existing in the vicinity of the carbon black, and the dispersion of the movement speed of the electric charge tended to easily occur.

In Comparative Example 4 in which the carbon black contained in the electro-conductive layer had a CTAB adsorption specific surface area larger than 100 m²/g, the relaxation time became longer than that of Example 1, similarly to those of Comparative Examples 3 and 8. This is considered to be because the specific surface area of the size which can adsorb the anion was large and the carbon black trapped more anions, and carriers of the electric charge decreased.

In Comparative Examples 5, 6 and 9 in which the carbon black contained in the electro-conductive layer had the DBP absorption number larger than 90 ml/100 g, similarly to Comparative Example 3, the relaxation time became longer than those of Examples 12, 15 and 11 which included the same resin having the nitrogen-containing heterocyclic cation structure and anion.

Comparative Example 7 in which the carbon black contained in the electro-conductive layer had the DBP absorption number larger than 90 ml/100 g and the CTAB adsorption specific surface area larger than 100 m²/g showed a longer relaxation time than that of Example 14. In addition, the relaxation time was longer than that of any of the comparative examples. This is considered to be because both of the effect of the large DBP absorption number and the effect of the large CTAB adsorption specific surface area worked and thereby the relaxation time became longer.

Comparative Example 10 which did not have the resin having the nitrogen-containing heterocyclic cation structure and the anion showed a long initial relaxation time compared to that of Example 1 having similar carbon black. This is considered to be because the dispersion of the movement speed of the electric charge occurred because Comparative Example 10 did not have the anion for transferring the electric charge to the electro-conductive layer, The developing roller according to each of Examples 1 to 3, of which YZ/X was in the range of 210 to 5400, showed short relaxation time after the durability test and also showed little fogging after the durability test, compared to the developing roller according to each of Examples 16 to 17, of which YZ/X was in the outside of the range of the above described numerical value. Similarly, the developing roller according to each of Examples 7 to 9 showed short relaxation time and little fogging after the durability test, compared to the developing rollers according to Examples 18 to 19.

Example 12 in which the anion contained in the electro-conductive layer was a bis(trifluoromethanesulfonyl) imide anion showed short relaxation time after the durability test, compared to Example 14 in which the anion was a fluoromethanesulfonate anion.

In addition, Example 2 in which the nitrogen-containing heterocyclic cation skeleton had an imidazolium skeleton of Structural Formula (3) showed short relaxation time both in the initial stage and after the durability test, compared to Example 15 in which the skeleton was a piperazinium skeleton and Example 12 in which the skeleton was a pyrrolidinium skeleton. Furthermore, Example 2 showed the fogging less than 1.5%, which was a more adequate result than those of Examples 12 and 15.

Example 10 in which the volatile-matter content of the carbon black contained in the electro-conductive layer was 1.5% showed short relaxation time after the durability test and an adequate result, compared to those of Example 13 in which the volatile-matter content was 1.0%.

<<Charging Roller>>

Example 20

(Production of Elastic Roller D-2)
The materials shown in Table 14 were mixed in a pressure type kneader, and an A kneaded rubber composition 1 was obtained.

TABLE 14

| | |
|---|---|
| NBR rubber material (trade name: Nipol DN 219, made by Zeon Corporation) | 100 parts by mass |
| Carbon black (trade name: Toca Black #7360SB, made by TOKAI CARBON CO., LTD.) | 40 parts by mass |
| Calcium carbonate (trade name: NANOX#30, made by MARUO CALCIUM CO., LTD.) | 20 parts by mass |
| Stearic acid (trade name: stearic acid S, made by Kao Corporation) | 1 part by mass |
| Zinc oxide | 5 parts by mass |

Furthermore, the materials of Table 15 were mixed with 166 parts by mass of the A kneaded rubber by an open roll, and an unvulcanized rubber composition 1 was obtained.

| | |
|---|---|
| Sulfur (trade name: Sulfax 200 S, made by Tsurumi Chemical Industry Co., Ltd.) | 1.2 parts by mass |
| Tetrabenzyl thiuram disulfide (trade name: TBZTD, made by SANSHIN CHEMICAL INDUSTRY CO., LTD.) | 4.5 parts by mass |

The unvulcanized rubber composition 1 was provided on the cored bar to form an unvulcanized rubber elastic layer, which was made from stainless steel (SUS 304) and had a diameter of 6 mm, by a cross head extruder, the unvulcanized rubber elastic layer was heated for 70 minutes in an oven which was heated to 160° C., and the crosslinking reaction of the vulcanized rubber elastic layer was completed. After that, the surface of the elastic layer was polished by a rotating grindstone. Thereby, an elastic roller D-2 was obtained of which the central portion diameter was 8.5 mm and of which the diameter at each position of 90 mm apart from the central portion to both end portions was 8.4 mm.

Paint for forming an electro-conductive layer was prepared in a similar way to that in Example 1, except that the polyol, the curing agent, the ion conductive agent and the carbon black were changed as shown in Table 16. The previously produced elastic roller D-2 was immersed in the paint, and a paint film of the paint was formed on the surface of the elastic layer of the elastic roller D-2, and was dried. The resultant elastic roller D-2 was further subjected to heat treatment at a temperature of 160° C. for 1 hour, thereby an electro-conductive layer having a film thickness of 15 μm was provided on the outer circumference of the elastic layer, and a developing roller according to Example 20 was produced.

On the obtained charging roller according to Example 20, the following items were evaluated. The results of the evaluation of the charging roller are shown in Table 19.

The collection of the carbon black contained in the electro-conductive layer, the evaluation of the DBP absorption number, the evaluation of the CTAB adsorption specific surface area, the evaluation of the volatile-matter content, the calculation of YZ/X, and the relaxation time were evaluated in a similar way to that in Example 1.

<Evaluation of Horizontal Streak Image>
When the relaxation time of the electro-conductive layer of the charging roller becomes long, fine streak-shaped density unevenness sometimes occurs in the halftone image. The density unevenness is referred to as a horizontal streak image. This horizontal streak image tends to deteriorate, as the surface potential of the charging roller rises which has passed through a nip between the charging roller and the photosensitive body, and tends to become conspicuous along with long-term use. The rise of the surface potential is greatly affected by the relaxation time, and as the relaxation time becomes long, the surface potential rises and the horizontal streak image tends to easily occur.

After the relaxation time was measured, in the same environment, a black cartridge which incorporated the charging roller according to Example 20 therein was charged into an evaluation apparatus that was a laser printer (trade name: HP Laser Jet Enterprise Color M553dn, made by HP Inc) which was modified so that the discharging speed became 60 sheets/minute; and thereby the horizontal streak was evaluated.

A durability test was carried out which continuously output images of a printing ratio of 1%. After the images of 100 sheets and 15000 sheets were output, a halftone image (image in which horizontal lines each having a width of 1 dot and a space of 2 dots were drawn in the direction perpendicular to the rotation direction of the photosensitive body) was output for image check. The obtained images were visually observed, and the horizontal streak was evaluated according to the following criteria. The image after 100 sheets were output was determined to be an initial image, and the image after 15,000 sheets were output was determined to be an image after the durability test.

A: horizontal streak is not recognized

B: horizontal streaks appear slightly only on the end of the image

C: horizontal streaks appear in almost half of the image and are conspicuous

<Relaxation Time after Durability Test>

After the above described horizontal streak after the durability test was evaluated, the charging roller which was charged in the cartridge was taken out, and the relaxation time after the durability test was calculated in a similar way to that in the previously described attenuation evaluation.

Examples 21 to 35

The charging rollers according to Examples 21 to 35 were produced in a similar way to that in Example 20, except that the types and used amounts of the polyol, the curing agent, the ion conductive agent and the carbon black which were used in the production of the charging roller were changed as shown in Table 16.

Comparative Examples 12 to 15

The charging rollers according to Comparative Examples 12 to 15 were produced in a similar way to that in Example 20, except that the types and used amounts of the polyol, the curing agent, the ion conductive agent and the carbon black which were used in the production of the charging roller were changed as shown in Table 17.

TABLE 16

|  |  | Polyol | | Curing agent | | Ion conductive agent | | Carbon black | | Roughening particle | |
|---|---|---|---|---|---|---|---|---|---|---|---|
|  |  | No. | Part by Mass | No. | Part by Mass | No. | Part by Mass | No. | Part by Mass | No. | Part by Mass |
| Example | 20 | A-2 | 79.2 | B-2 | 31.7 | C-1 | 1.11 | E-1 | 16.6 | Art-peal | 11.2 |
|  | 21 |  | 71.6 |  | 29.0 | C-2 | 1.70 |  | 28.2 | C-800T | 10.2 |
|  | 22 |  | 71.0 |  | 28.4 | C-3 | 1.58 |  | 29.1 |  | 10.1 |
|  | 23 |  | 78.9 |  | 31.2 |  | 1.17 | E-4 | 18.3 |  | 11.1 |
|  | 24 |  | 70.0 |  | 28.9 | C-4 | 1.95 | E-1 | 29.7 |  | 10.1 |
|  | 25 |  | 71.0 |  | 28.8 | C-10 | 1.78 |  | 28.9 |  | 10.2 |
|  | 26 |  | 81.1 |  | 34.9 |  | 4.78 | E-4 | 7.0 |  | 12.1 |
|  | 27 |  | 78.0 |  | 31.2 |  | 1.32 |  | 18.2 |  | 11.1 |
|  | 28 |  | 79.4 |  | 31.1 |  | 0.48 |  | 17.8 |  | 11.1 |
|  | 29 |  | 78.4 |  | 31.9 | C-12 | 1.25 | E-1 | 17.0 |  | 11.2 |
|  | 30 |  | 75.3 |  | 30.5 | C-13 | 1.46 |  | 21.8 |  | 10.7 |
|  | 31 |  | 71.0 |  | 28.7 | C-2 | 1.54 | E-2 | 30.2 |  | 10.1 |
|  | 32 |  | 79.1 |  | 31.0 | C-3 | 0.58 | E-3 | 16.6 |  | 11.1 |
|  | 33 |  | 79.1 |  | 31.0 |  | 0.65 | E-5 | 18.5 |  | 11.1 |
|  | 34 |  | 80.6 |  | 35.4 | C-10 | 5.80 | E-4 | 5.8 |  | 12.2 |
|  | 35 |  | 71.3 |  | 28.1 |  | 0.60 |  | 29.8 |  | 10.0 |

TABLE 17

|  |  | Polyol | | Curing agent | | Ion conductive agent | | Carbon black | | Roughening particle | |
|---|---|---|---|---|---|---|---|---|---|---|---|
|  |  | No. | Part by mass | No. | Part by mass | No. | Part by mass | No. | Part by mass | No. | Part by mass |
| Comparative Example | 12 | A-2 | 79.3 | B-2 | 31.6 | C-2 | 1.11 | E-6 | 16.6 | Art-peal | 11.2 |
|  | 13 |  | 79.5 |  | 31.4 | C-3 |  | E-8 |  | C-800T |  |
|  | 14 |  | 79.4 |  | 31.6 | C-10 |  | E-9 |  |  |  |
|  | 15 |  | 78.9 |  | 32.0 | C-12 |  | E-10 |  |  |  |

The above described charging rollers according to Examples 21 to 35 and Comparative Examples 12 to 15 were evaluated in a similar way to that in Example 18. Evaluation results are shown in Tables 18 and 19.

TABLE 18

|  |  | Example 20 | Example 21 | Example 22 | Example 23 | Example 24 | Example 25 |
|---|---|---|---|---|---|---|---|
| Cation skeleton |  |  |  | Imidazolium |  |  | Pyridinium |
| Structure of (c) |  |  |  | Z-1 |  |  |  |
| Anion |  | $(CF_3SO_2)_2N$ | $(C_2F_5SO_2)_2N$ | $(C_4F_9SO_2)_2N$ |  | $CF_2(CF_2SO_2)_2N$ | $(C_2F_5SO_2)_2N$ |
| DBP absorption number (ml/100g) |  | 75 | 75 | 75 | 65 | 76 | 75 |
| CTAB adsorption specific surface area ($m^2/g$) |  | 85 | 85 | 85 | 100 | 85 | 85 |
| Volatile-matter content (%) |  | 2.0 | 2.1 | 2.0 | 1.5 | 2.0 | 2.0 |
| YZ/X |  | 1990 | 1990 | 1990 | 1990 | 1990 | 1990 |
| Relaxation time (s) | Initial stage | 7.80E−02 | 7.80E−02 | 7.70E−02 | 8.10E−02 | 7.70E−02 | 7.80E−02 |
|  | After durability test | 7.90E−02 | 7.90E−02 | 7.90E−02 | 8.30E−02 | 7.90E−02 | 7.90E−02 |
| Electric charge horizontal streak | Initial stage | A | A | A | A | A | A |
|  | After durability test | A | A | A | A | A | A |

|  |  | Example 26 | Example 27 | Example 28 | Example 29 | Example 30 |
|---|---|---|---|---|---|---|
| Cation skeleton |  |  | Pyridinium |  | Imidazolium | Pyrrolidinium |
| Structure of (c) |  |  |  | Z-1 |  |  |
| Anion |  |  | $(C_2F_5SO_2)_2N$ |  | $(CF_3SO_2)_2N$ |  |
| DBP absorption number (ml/100g) |  | 65 | 65 | 66 | 75 | 75 |
| CTAB adsorption specific surface area ($m^2/g$) |  | 100 | 100 | 100 | 85 | 85 |
| Volatile-matter content (%) |  | 1.5 | 1.5 | 1.5 | 2.0 | 2.0 |
| YZ/X |  | 210 | 1990 | 5400 | 1990 | 1990 |
| Relaxation time (s) | Initial stage | 8.20E−02 | 8.10E−02 | 8.20E−02 | 8.20E−02 | 8.10E−02 |
|  | After durability test | 8.40E−02 | 8.40E−02 | 8.40E−02 | 8.50E−02 | 8.70E−02 |
| Electric charge horizontal streak | Initial stage | A | A | A | A | A |
|  | After durability test | A | A | A | A | A |

TABLE 19

|  |  | Example 31 | Example 32 | Example 33 | Example 34 | Example 35 | Comparative Example 12 | Comparative Example 13 | Comparative Example 14 | Comparative Example 15 |
|---|---|---|---|---|---|---|---|---|---|---|
| Cation skeleton |  |  | Imidazolium |  | Pyridinium |  | Imidazolium |  | Pyridinium | Pyrrolidinium |
| Structure of (c) |  |  |  |  |  | Z-1 |  |  |  |  |
| Anion |  | $(C_2F_5SO_2)_2N^-$ | $(C_4F_9SO_2)_2N^-$ |  | $(C_2F_5SO_2)_2N^-$ |  | $(C_4F_9SO_2)_2N^-$ | $(C_2F_5SO_2)_2N^-$ |  | $(CF_3SO_2)_2N^-$ |
| DBP absorption number (ml/100 g) |  | 90 | 70 | 45 | 65 | 65 | 42 | 101 | 68 | 112 |
| CTAB adsorption specific surface area ($m^2/g$) |  | 75 | 50 | 55 | 100 | 100 | 65 | 83 | 105 | 74 |
| Volatile-matter content (%) |  | 1.0 | 0.6 | 1.0 | 1.5 | 1.5 | 0.5 | 0.6 | 3.0 | 1.5 |
| YZ/X |  | 1990 | 1990 | 1990 | 144 | 7211 | 1378 | 1598 | 2294 | 1926 |
| Relaxation time (s) | Initial stage | 8.20E−02 | 8.20E−02 | 8.20E−02 | 8.10E−02 | 8.20E−02 | 2.10E−01 | 2.20E−01 | 2.10E−01 | 2.30E−01 |
|  | After durability test | 9.10E−02 | 9.20E−02 | 9.10E−02 | 9.70E−02 | 9.60E−02 | 2.50E−01 | 2.60E−01 | 2.80E−01 | 3.00E−01 |
| Electric charge horizontal streak | Initial stage | A | A | A | A | A | C | C | C | C |
|  | After durability test | A | A | A | B | B | C | C | C | C |

Comparative Examples 12 to 15 have carbon black in the electro-conductive layer, but either the DBP absorption number or the CTAB adsorption specific surface area is not in the range of 45 ml/100 g or more and 90 ml/100 g or less, or 50 m²/g or more and 100 m²/g or less, respectively. Because of this, when Comparative Example 12 is compared with Example 21, Comparative Example 13 is compared with Examples 22 and 23, Comparative Example 14 is compared with Examples 25, and 26 to 28, and Comparative Example 15 is compared with Example 29, respectively, every Comparative Example showed longer relaxation time both in the initial stage and after the durability test. As for Comparative Examples 12 to 15, the initial relaxation time was 0.15 seconds or longer, and the horizontal streak image occurred from the initial stage. As for Example 34 in which YZ/X was smaller than 210 and Example 35 in which YZ/X is larger than 5400, the relaxation time after the durability test became long compared to those of Examples 26 to 28. Examples 22 and 23 in which the volatile-matter content of carbon black contained in the electro-conductive layer was 1.5% or more showed short relaxation times in the initial stage and after the durability test, and showed adequate results, compared to those in Examples 31 to 33 in which the volatile-matter content was less than 1.0%. As for Example 29 of which the nitrogen-containing heterocyclic cation structure was the structure of (1), the relaxation time was shorter than that of Example 30 of which the nitrogen-containing heterocyclic cation structure was a pyrrolidinium structure. Furthermore, as for Examples 20 to 22, 24 and 25 in which the nitrogen-containing heterocyclic cation structure was (3) or (4), the relaxation time was further shortened, compared to that of Example 29.

<<Developing Blade>>

Example 36

(Preparation of Paint for Forming Blade Elastic Layer)
As for the material of the elastic layer of the developing blade, the following materials were stirred and mixed, and paint for forming the blade elastic layer was prepared.
  Amine-based polyol (trade name: Excenol 500 ED, made by Asahi Glass Co., Ltd.): 25.5 parts by mass
  Polyisocyanate (trade name: Coronate L, made by Tosoh Corporation); 112.6 parts by mass
  Ion conductive agent (trade name: PEL-20A, made by Japan Carlit Co., Ltd.): 1.5 parts by mass
  Silica (trade name: AEROSIL 200, made by Nippon Aerosil Co., Ltd.): 10.0 parts by mass
  Methyl ethyl ketone: 150.8 parts by mass
(Preparation of Paint for Forming Electro-Conductive Layer)
Paint for forming an electro-conductive layer was prepared in a similar way to that in Example 1, except that the polyol, the curing agent, the ion conductive agent and the carbon black were changed as shown in Table 20, and that the roughening particle was eliminated.

(Production of Developing Blade)
A sheet of stainless steel having a thickness of 0.08 mm (SUS 304, made by Nisshin Steel Co., Ltd.) was press-cut into a size of 200 mm in length and 23 mm in width, as a supporting substrate, and a sheet made from stainless steel was prepared. Next, a region of 1.5 mm wide from the longitudinal side end of the cut sheet made from stainless steel was immersed in the paint for forming the blade elastic layer, and a paint film of the paint was formed and dried. The paint film was further subjected to heat treatment at 120° C. for 30 minutes, and an elastic layer having a film thickness of 10 μm was provided on the surface of the longitudinal side end of the supporting substrate.

After that, a portion on which the elastic layer of the blade was formed was immersed in the paint for forming the electro-conductive layer, similarly to the elastic layer; and a paint film was formed, and then was dried at room temperature for 10 minutes. Furthermore, the paint film was further subjected to heat treatment at a temperature of 160° C. for 0.5 hours, and a developing blade according to Example 36 was produced. The film thickness of the electro-conductive layer was 20 μm.

On the obtained developing blade according to Example 36, the following items were evaluated. The results of evaluation as the developing blade are shown in Table 22.

The collection of the carbon black contained in the electro-conductive layer, the evaluation of the DBP absorption number, the evaluation of the CTAB adsorption specific surface area, the evaluation of the volatile-matter content, the calculation of YZ/X, and the relaxation time were evaluated in a similar way to that in Example 1.

<Evaluation of Presence or Absence of Regulation Failure>

The phenomenon that the toners on the developing roller are excessively charged and electrostatically agglomerate is referred to as a regulation failure. When the regulation failure has occurred, there is a case where spot-like unevenness, toner lumps or the like occurs, for example, in a non-printed portion, in an electrophotographic image.

The excessive charging of the toner on the developing roller is also caused by an excess supply of electric charges from the developing blade. In particular, when the electro-conductive layer of which the relaxation time is long is used, electric charges which were generated due to rubbing between the developing roller and the toner result in being accumulated, the electric charges of the excessively charged toner cannot be released and the regulation failure tends to easily occur.

After the relaxation time has been measured, in the same environment, the regulation failure was evaluated in the following way. Firstly, an evaluation machine was prepared that was an HP laser printer (trade name: HP Laser Jet Enterprise Color M 553dn) which was modified so that the discharging speed became 60 sheets/minute. Into the evaluation machine, a black cartridge incorporating the developing blade according to Example 36 was charged.

A durability test was carried out which continuously output images of a printing ratio of 1%. After images of 100 sheets and 15000 sheets were output, the state of toner coating on the surface of the developing roller was visually observed, and the presence or absence of the regulation failure was observed. This observation results were evaluated according to the following criteria. The image after 100 sheets were output was determined to be the initial image, and the image after 15000 sheets were output was determined to be an image after the durability test.
A: the regulation failure does not exist on the toner coating.
B: the regulation failure exists on the toner coating, but does not appear on the image.
C: the regulation failure appears in the image.

<Relaxation Time after Durability Test>
After the regulation failure after the above described durability test was evaluated, the developing blade which was charged in the cartridge was taken out, and the relaxation time after the durability test was calculated in a similar way to that in the previously described attenuation evaluation.

Examples 37 to 44

The developing blades according to Examples 37 to 44 were produced in a similar way to that in Example 36, except that the types and used amounts of the polyol, the curing agent, the ion conductive agent and the carbon black which were used in the production of the developing blade were changed as shown in Table 20.

Comparative Examples 16 to 19

The developing blades according to Comparative Examples 16 to 19 were produced in a similar way to that in Example 36, except that the types and used amounts of the polyol, the curing agent, the ion conductive agent and the carbon black which were used in the production of the developing blade were changed as shown in Table 20.

TABLE 20

|  |  | Polyol | | Curing agent | | Ion conductive agent | | Carbon black | |
|---|---|---|---|---|---|---|---|---|---|
|  |  | No. | Part by mass | No. | Part by mass | No. | Part by mass | No. | Part by mass |
| Example | 36 | A-1 | 59.0 | B-1 | 88.1 | C-1 | 1.21 | E-1 | 18.1 |
|  | 37 |  | 53.4 |  | 84.6 | C-5 | 2.12 |  | 28.2 |
|  | 38 |  | 56.0 |  | 85.6 | C-7 | 1.75 |  | 22.0 |
|  | 39 |  | 57.8 |  | 83.5 | C-11 | 1.37 |  | 22.1 |
|  | 40 |  | 50.5 |  | 110.6 | C-14 | 5.17 |  | 6.8 |
|  | 41 |  | 51.9 |  | 87.8 |  | 2.10 |  | 26.1 |
|  | 42 |  | 58.0 |  | 87.1 |  | 0.99 |  | 33.4 |
|  | 43 |  | 46.6 |  | 114.8 |  | 6.35 |  | 6.7 |
|  | 44 |  | 52.9 |  | 78.3 |  | 0.75 |  | 31.5 |
| Comparative Example | 16 |  | 58.2 |  | 89.1 |  | 1.21 | E-7 | 18.3 |
|  | 17 |  | 59.3 |  | 87.6 | C-5 | 1.21 | E-8 | 18.3 |
|  | 18 |  | 59.3 |  | 87.2 | C-7 | 1.20 | E-9 | 18.2 |
|  | 19 |  | 60.2 |  | 86.2 | C-11 | 1.21 | E-11 | 18.3 |

The developing blades according to Examples 37 to 44 and Comparative Examples 16 to 19 were evaluated in a similar way to that in Example 36. Evaluation results are shown in Tables 21 and 22.

TABLE 21

|  |  | Example 36 | Example 37 | Example 38 | Example 39 | Example 40 | Example 41 | Example 42 |
|---|---|---|---|---|---|---|---|---|
| Cation skeleton |  | Imidazolium | | | | | Pyrrolidinium | |
| Structure of (c) |  |  | | | Z-1 | | | |
| Anion |  |  | | | $(CF_3SO_2)_2N^-$ | | | |
| DBP absorption number (ml/100 g) |  | 75 | 75 | 75 | 76 | 75 | 76 | 75 |
| CTAB adsorption specific surface area ($m^2/g$) |  | 85 | 85 | 85 | 85 | 85 | 85 | 85 |
| Volatile-matter content (%) |  | 2.0 | 2.1 | 2.0 | 2.0 | 2.1 | 2.0 | 2.0 |
| YZ/X |  | 1990 | 1990 | 1990 | 1990 | 210 | 1990 | 5400 |
| Relaxation time (s) | Initial stage | 7.9E−02 | 7.8E−02 | 7.9E−02 | 8.2E−02 | 8.1E−02 | 8.2E−02 | 8.2E−02 |
|  | After durability test | 8.0E−02 | 7.9E−02 | 8.0E−02 | 9.1E−02 | 9.2E−02 | 9.2E−02 | 9.2E−02 |
| Regulation failure | Initial stage | A | A | A | A | A | A | A |
|  | After durability test | A | A | A | A | A | A | A |

TABLE 22

|  | Example 43 | Example 44 | Comparative Example 16 | Comparative Example 17 | Comparative Example 18 | Comparative Example 19 |
|---|---|---|---|---|---|---|
| Cation skeleton | Pyrrolidinium | | | | Imidazolium | |
| Structure of (c) |  | | Z-1 | | | |
| Anion |  | | $(CF_3SO_2)_2N$ | | | |
| DBP absorption number (ml/100 g) | 75 | 75 | 46 | 101 | 68 | 100 |
| CTAB adsorption specific surface area ($m^2/g$) | 85 | 85 | 40 | 83 | 105 | 110 |
| Volatile-matter content (%) | 2.0 | 2.1 | 2.0 | 0.6 | 3.0 | 1.5 |

TABLE 22-continued

|  |  | Example 43 | Example 44 | Comparative Example 16 | Comparative Example 17 | Comparative Example 18 | Comparative Example 19 |
|---|---|---|---|---|---|---|---|
| YZ/X | | 160 | 6632 | 1130 | 2192 | 2931 | 2398 |
| Relaxation time (s) | Initial stage | 8.2E−02 | 8.2E−02 | 2.1E−01 | 2.2E−01 | 1.9E−01 | 2.3E−01 |
|  | After durability test | 9.6E−02 | 9.6E−02 | 2.5E−01 | 2.5E−01 | 2.3E−01 | 2.7E−01 |
| Regulation failure | Initial stage | A | A | C | C | C | C |
|  | After durability test | B | B | C | C | C | C |

Comparative Examples 16 to 19 have the carbon black in the electro-conductive layer, but either the DBP absorption number or the CTAB adsorption specific surface area is not in the range of 45 ml/100 g or more and 90 ml/100 g or less, or 50 m$^2$/g or more and 100 m$^2$/g or less, respectively. Because of this, when Comparative Example 16 is compared with Examples 40 to 44, Comparative Example 17 is compared with Example 37, Comparative Example 18 is compared with Example 38, and Comparative Example 19 is compared with Example 39, respectively, every Comparative Example showed longer relaxation times both in the initial stage and after the durability test, and exhibited the regulation failure in the image.

As for Example 43 in which YZ/X was smaller than 210 and Example 44 in which YZ/X is larger than 5400, the relaxation time after the durability test became long compared to those of Examples 40 to 42, and slight regulation failures occurred on the toner coating after the durability test. In Examples 36 to 38 having the structure of Structure Formula (3), the relaxation times in the initial stage and after the durability test were further shortened, compared to that of Example 39 in which the number of (c) in Structure Formula (1) was one.

<<Toner Supply Roller>>

Example 45

<Production of Toner Supply Roller>

A cored bar which is made from stainless steel (SUS 304) and has a diameter of 5 mm was placed in a mold, and a urethane rubber composition in which the following materials were mixed was injected into cavities formed in the mold.

Polyether polyol A-3 (trade name: Actcol EP 550 N); 85.0 parts by mass
Curing agent B-3 (trade name: Cosmonate TM 20): 23.9 parts by mass
Ion conductive agent C-1; 1.09 parts by mass
Silicone foam stabilizer (trade name: SRX 274 C, made by Dow Corning Toray Silicone Co., Ltd.); 0.4 parts by mass
Amine catalyst (trade name: TOYOCAT-ET, made by Tosoh Corporation); 0.3 parts by mass
Amine catalyst (trade name: TOYOCAT-L33, made by Tosoh Corporation): 0.5 parts by mass
Water: 1.5 parts by mass
Carbon black E-1; 16.3 parts by mass Subsequently, the mold was heated, and the urethane rubber composition was vulcanized at a temperature of 50° C. for 20 minutes, was foamed and cured, and a shaft core body which had the polyurethane foam layer formed on its circumferential surface was released from the mold. In the above manner, a polyurethane foam layer having a diameter of 16.1 mm was formed on the outer circumference of the shaft core body, and a toner supply roller according to Example 45 was produced.

On the obtained toner supply roller according to Example 45, the following items were evaluated. The results of evaluation as a developing blade are shown in Table 24.

The collection of the carbon black contained in the electro-conductive layer, the evaluation of the DBP absorption number, the evaluation of the CTAB adsorption specific surface area, the evaluation of the volatile-matter content, the calculation of YZ/X, and the relaxation time were evaluated in a similar way to that in Example 1.

<Evaluation of Presence or Absence of Solid Followability Failure>

A solid followability failure is such a phenomenon that when a high print image has been printed, a density difference occurs between a leading end and a rear end of the output paper, or an image dropout occurs. It is known that this phenomenon occurs because an amount of the toner runs short which is supplied from the toner supply roller onto the developing roller. It is known that the amount of the toner which is supplied from the toner supply roller depends on an amount of electric charges on the toner, and as the amount of the electric charges increases, the supply amount decreases. When the relaxation time of the toner supply roller becomes long, the electric charge on the overcharged toner cannot be escaped completely, the amount of the electric charges on the toner increases, and the supply amount of the toner tends to decrease. As a result, the solid followability failure tends to easily occur.

The solid followability failure was evaluated according to the following method.

After the previously described relaxation time was measured, the regulation failure was evaluated in the following way. Firstly, an evaluation machine was prepared that was a laser printer (trade name: HP Laser Jet Enterprise Color M 553dn, made by HP Inc.) which was modified so that the discharging speed became 60 sheets/minute. A magenta cartridge incorporating the toner supply roller according to Example 45 was charged in the above described evaluation machine.

Subsequently, a durability test was carried out which continuously output images of a printing rate of 1%. After 100 sheets and 15000 sheets of images were output, three consecutive solid black images were output, and a density difference at the leading end of the third solid black image was measured with a spectrophotometer (trade name: SPECTORDESITOMETER 518, made by X-Rite Inc.). The measurement results were evaluated according to the following criteria. The image after 100 sheets were output was determined to be the initial image, and the image after 15000 sheets were output was determined to be an image after the durability test.

A: in all solid images, the density difference between the leading end of the paper and the rear end of the paper is less than 0.2.

B: in all solid images, the density difference between the leading end of the paper and the rear end of the paper is 0.2 to less than 0.3.

C: in all solid images, the density difference between the leading end of the paper and the rear end of the paper is 0.3 or more.

<Relaxation Time after Durability Test>

After the solid followability failure after the above described durability test was evaluated, the toner supply roller which was charged in the cartridge was taken out, and the relaxation time after the durability test was calculated in a similar way to that in the attenuation evaluation described in Example 1.

Examples 46 to 55

The toner supply rollers according to Examples 46 to 55 were produced in a similar way to that in Example 45, except that the types and used amounts of the polyol, the curing agent, the ion conductive agent and the carbon black which were used in the production of the toner supply roller were changed as shown in Table 23.

Comparative Examples 20 to 23

The toner supply rollers according to Comparative Examples 20 to 23 were produced in a similar way to that in Example 45, except that the types and used amounts of the polyol, the curing agent, the ion conductive agent and the carbon black which were used in the production of the toner supply roller were changed as shown in Table 23.

TABLE 23

|  |  | Polyol | | Curing agent | | Ion conductive agent | | Carbon black | |
|---|---|---|---|---|---|---|---|---|---|
|  |  | No. | Part by mass | No. | Part by mass | No. | Part by mass | No. | Part by mass |
| Example | 45 | A-3 | 85.0 | B-3 | 23.9 | C-1 | 1.09 | E-1 | 16.3 |
|  | 46 |  |  |  | 23.9 | C-6 | 1.44 |  | 18.5 |
|  | 47 |  |  |  | 24.2 | C-8 | 2.63 |  | 28.4 |
|  | 48 |  |  |  | 24.0 | C-9 | 1.34 |  | 19.6 |
|  | 49 |  |  |  | 24.3 | C-12 | 1.52 | E-4 | 17.6 |
|  | 50 |  |  |  | 24.0 |  | 1.03 | E-5 | 21.6 |
|  | 51 |  |  |  | 25.7 | C-13 | 5.27 | E-2 | 9.4 |
|  | 52 |  |  |  | 23.9 |  | 1.14 |  | 19.2 |
|  | 53 |  |  |  | 23.7 |  | 0.59 |  | 26.9 |
|  | 54 |  |  |  | 25.8 |  | 5.54 |  | 5.5 |
|  | 55 |  |  |  | 23.7 |  | 0.76 |  | 31.5 |
| Comparative Example | 20 |  |  |  | 23.9 |  | 1.09 | E-6 | 16.3 |
|  | 21 |  |  |  | 23.8 | C-6 | 1.09 | E-7 | 16.3 |
|  | 22 |  |  |  | 24.06 | C-12 | 1.10 | E-9 | 16.4 |
|  | 23 |  |  |  | 23.75 | C-8 | 1.09 | E-12 | 16.3 |

The above described toner supply rollers according to Examples 46 to 55 and Comparative Examples 20 to 23 were evaluated in a similar way to that in Example 45. Evaluation results are shown in Tables 24 and 25.

TABLE 24

|  |  | Example 45 | Example 46 | Example 47 | Example 48 | Example 49 | Example 50 | Example 51 | Example 52 | Example 53 |
|---|---|---|---|---|---|---|---|---|---|---|
| Cation skeleton Structure of (c) |  |  | Imidazolium | | Pyridinium | Imidazolium Z-1 | | | Pyrrolidinium | | |
| Anion |  |  |  |  |  | $(CF_3SO_2)_2N^-$ | | | | |
| DBP absorption number (ml/100 g) |  | 75 | 75 | 75 | 75 | 65 | 45 | 90 | 90 | 90 |
| CTAB adsorption specific surface area ($m^2/g$) |  | 85 | 85 | 85 | 85 | 100 | 55 | 75 | 75 | 75 |
| Volatile-matter content (%) |  | 2.0 | 2.0 | 2.1 | 2.0 | 2.0 | 1.5 | 1.0 | 1.0 | 1.0 |
| YZ/X |  | 1990 | 1990 | 1990 | 1990 | 1990 | 1990 | 210 | 1990 | 5400 |
| Relaxation time (s) | Initial stage | 0.078 | 0.078 | 0.079 | 0.078 | 0.082 | 0.082 | 0.081 | 0.082 | 0.082 |
|  | After durability test | 0.079 | 0.079 | 0.08 | 0.079 | 0.085 | 0.091 | 0.092 | 0.093 | 0.093 |
| Solid followability failure | Initial stage | A | A | A | A | A | A | A | A | A |
|  | After durability test | A | A | A | A | A | A | A | A | A |

TABLE 25

|  |  | Example 54 | Example 55 | Comparative Example 20 | Comparative Example 21 | Comparative Example 22 | Comparative Example 23 |
|---|---|---|---|---|---|---|---|
| Cation skeleton Structure of (c) |  | Pyrrolidinium | | Z-1 | | Imidazolium | |
| Anion |  |  |  | $(CF_3SO_2)_2N^-$ | | | |
| DBP absorption number (ml/100 g) |  | 90 | 90 | 42 | 46 | 68 | 172 |

TABLE 25-continued

| | | Example 54 | Example 55 | Comparative Example 20 | Comparative Example 21 | Comparative Example 22 | Comparative Example 23 |
|---|---|---|---|---|---|---|---|
| CTAB adsorption specific surface area ($m^2/g$) | | 75 | 75 | 65 | 40 | 105 | 56 |
| Volatile-matter content (%) | | 1.0 | 1.0 | 0.5 | 2 | 3 | 0.7 |
| YZ/X | | 118 | 7055 | 1529 | 1091 | 2706 | 7001 |
| Relaxation time (s) | Initial stage | 0.082 | 0.082 | 0.19 | 0.21 | 0.22 | 0.21 |
| | After durability test | 0.096 | 0.097 | 0.23 | 0.25 | 0.25 | 0.25 |
| Solid followability failure | Initial stage | A | A | C | C | C | C |
| | After durability test | B | B | C | C | C | C |

Comparative Examples 20 to 23 have carbon black in the electro-conductive layer, but either the DBP absorption number or the CTAB adsorption specific surface area is not in the range of 45 ml/100 g or more and 90 ml/100 g or less, or 50 $m^2/g$ or more and 100 $m^2/g$ or less, respectively. Because of this, when Comparative Example 20 is compared with Example 51 to 55, Comparative Example 21 is compared with Example 46, Comparative Example 22 is compared with Examples 49 and 50, and Comparative Example 23 is compared with Example 47, respectively, every Comparative Example showed longer relaxation times in the initial stage and after the durability test, and showed the solid followability failure.

As for Example 54 in which YZ/X was smaller than 210 and Example 55 in which YZ/X is larger than 5400, the relaxation time after the durability test became long compared to those of Examples 51 to 53. As for Examples 49 and 50 which have the structure of Structural Formula (1), the relaxation times in the initial stage and after the durability test became shorter than those of Example 52 in which the nitrogen-containing heterocyclic cation structure was a pyrrolidinium skeleton. As for Example 50 in which the volatile-matter content of the carbon black contained in the electro-conductive layer was 1.0%, relaxation times in the initial stage and after the durability test became long with respect to those of Example 49 in which the volatile-matter content was 1.5% or more. Examples 45 to 47 in which the nitrogen-containing heterocyclic cation structure was the structure of Structural Formula (3) and Example 48 in which the cation structure was the structure of Structural Formula (4) showed further short relaxation time and showed adequate results, compared to that of Example 49 in which the number of (c) in Structural Formula (1) was three.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-081561, filed Apr. 20, 2018, which is hereby incorporated by reference herein in its entirety.

What is claimed is:

1. A member for electrophotography, comprising:
an electro-conductive substrate; and
an electro-conductive layer as an outermost layer, the electro-conductive layer containing a resin having a nitrogen-containing heterocyclic cation structure, an anion and carbon black, wherein the carbon black has a DBP absorption number of 45 to 90 ml/100 g, and a CTAB adsorption specific surface area of 50 to 100 $m^2/g$.

2. The member for electrophotography according to claim 1, which satisfies $$210 \leq \frac{YZ}{X} \leq 5400 \quad (1)$$

where wherein X (g) represents the mass of the anion, Y ($m^2/g$) represents the CTAB adsorption specific surface area of the carbon black and Z (g) represents the mass of the carbon black, in the electro-conductive layer.

3. The member for electrophotography according to claim 1, wherein the anion is selected from the group consisting of a bis(trifluoromethanesulfonyl) imide anion, a bis(pentafluoroethanesulfonyl) imide anion, a bis(nonafluorobutanesulfonyl) imide anion and an N,N-hexafluoropropane-1,3-disulfonyl imide anion.

4. The member for electrophotography according to claim 1, wherein a volatile-matter content of the carbon black is 1.5% or more.

5. The member for electrophotography according to claim 1, wherein the structure of the resin has one or both of structures (1) and (2):

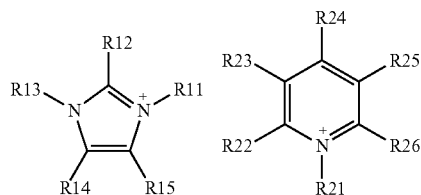

where R11 to 15 and R21 to 26 are independently selected from (a) to (c) wherein (a) is a hydrogen atom, (b) is a saturated hydrocarbon group having 1 to 6 carbon atoms, and (c) is a structure containing a moiety bonded to a resin, with the proviso that at least one of R11 to R15 is (c) and at least one of R21 to 26 is (c).

6. The member for electrophotography according to claim 1, wherein the structure of the resin has one or both of structures (3) and (4):

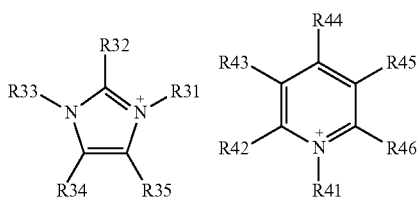

where R31 to 35 and R41 to 46 are independently selected from (a) to (c) wherein (a) is a hydrogen atom, (b) is a saturated hydrocarbon group having 1 to 6 carbon atoms, and (c) is a structure containing a moiety bonded to a resin, with the proviso that two of R31 to R35 are (c) and two of R41 to R46 are (c).

7. A process cartridge configured to be detachably mounted on a main body of an electrophotographic apparatus, and having at least one member for electrophotography selected from the group consisting of a charging member, a developing member and a cleaning member, said at least one charging member, developing member and cleaning member comprising:

an electro-conductive substrate; and an electro-conductive layer as an outermost layer, the electro-conductive layer containing a resin having a nitrogen-containing heterocyclic cation structure, an anion and carbon black, wherein the carbon black has a DBP absorption number of 45 to 90 ml/100 g, and a CTAB adsorption specific surface area of 50 to 100 $m^2/g$.

8. An electrophotographic apparatus comprising at least one member for electrophotography selected from the group consisting of a charging member, a developing member and a cleaning member, said at least one charging member, developing member and cleaning member comprising:

an electro-conductive substrate; and an electro-conductive layer as an outermost layer, the electro-conductive layer containing a resin having a nitrogen-containing heterocyclic cation structure, an anion and carbon black, wherein the carbon black has a DBP absorption number of 45 to 90 ml/100 g, and a CTAB adsorption specific surface area of 50 to 100 $m^2/g$.

9. A member for electrophotography, comprising:

an electro-conductive substrate; and an electro-conductive layer as an outermost layer, the electro-conductive layer containing a resin having a cation structure, an anion and carbon black, wherein the carbon black has a DBP absorption number of 45 to 90 ml/100 g, and a CTAB adsorption specific surface area of 50 to 100 $m^2/g$.

* * * * *